(12) United States Patent
Liu et al.

(10) Patent No.: US 11,669,653 B2
(45) Date of Patent: Jun. 6, 2023

(54) SIMULATED VEHICLE TRAFFIC FOR AUTONOMOUS VEHICLES

(71) Applicant: The Regents of the University of Michigan, Ann Arbor, MI (US)

(72) Inventors: Xianghong Liu, Ann Arbor, MI (US); Yiheng Feng, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 702 days.

(21) Appl. No.: 16/609,996

(22) PCT Filed: May 2, 2018

(86) PCT No.: PCT/US2018/030737
§ 371 (c)(1),
(2) Date: Oct. 31, 2019

(87) PCT Pub. No.: WO2018/204544
PCT Pub. Date: Nov. 8, 2018

(65) Prior Publication Data
US 2020/0065443 A1    Feb. 27, 2020

Related U.S. Application Data

(60) Provisional application No. 62/500,299, filed on May 2, 2017.

(51) Int. Cl.
*G06F 30/20* (2020.01)
*H04W 4/44* (2018.01)
*G08G 1/09* (2006.01)

(52) U.S. Cl.
CPC .............. *G06F 30/20* (2020.01); *G08G 1/09* (2013.01); *H04W 4/44* (2018.02)

(58) Field of Classification Search
CPC ............ G06F 30/20; G08G 1/09; H04W 4/44
See application file for complete search history.

(56) References Cited

U.S. PATENT DOCUMENTS

| 5,880,362 A | 3/1999 | Tang et al. |
| 8,190,295 B1 | 5/2012 | Garretson |

(Continued)

FOREIGN PATENT DOCUMENTS

| CN | 103207090 A | 7/2013 |
| CN | 204576955 U | 8/2015 |

(Continued)

OTHER PUBLICATIONS

Chinese Office Action corresponding to Chinese Application 201880039605.8, with English language summary; dated Oct. 2021; 15 pages.

(Continued)

*Primary Examiner* — Ajay Cattungal
(74) *Attorney, Agent, or Firm* — Reising Ethington P.C.

(57) ABSTRACT

A system and method for simulating a real roadway environment that can be used for testing of a real connected autonomous vehicle (CAV) on roadways using augmented reality to add simulated virtual environmental objects such as additional vehicles, pedestrians, and other obstructions to the nearby surroundings seen by the CAV under test. The method carried out by the system includes: receiving vehicle status information indicating the location of a connected real vehicle as it moves along a roadway; and generating a simulated environment of the real vehicle on the roadway using a mapped model of the roadway and the vehicle status information. The simulated environment includes one or (Continued)

more virtual objects such as vehicles, pedestrians, or other obstructions, and these simulated virtual objects may be sent to the real vehicle for testing of its response without requiring the use of real vehicles, pedestrians, or other obstructions.

18 Claims, 13 Drawing Sheets

(56) References Cited

U.S. PATENT DOCUMENTS

| | | |
|---|---|---|
| 2002/0052724 A1 | 5/2002 | Sheridan |
| 2005/0137756 A1 | 6/2005 | Takahashi |
| 2016/0210383 A1 | 7/2016 | Alaniz et al. |
| 2016/0314224 A1 | 10/2016 | Wei et al. |
| 2017/0069209 A1* | 3/2017 | Beaurepaire ..... G08G 1/096811 |
| 2017/0103571 A1* | 4/2017 | Beaurepaire ............ G06F 3/011 |
| 2017/0301232 A1* | 10/2017 | Xu ........................... G06T 17/05 |
| 2018/0075740 A1* | 3/2018 | Radomy .................. G08G 1/07 |
| 2018/0122227 A1* | 5/2018 | Mubarek .......... G08G 1/096844 |
| 2018/0122229 A1* | 5/2018 | Mubarek ................ G08B 21/18 |
| 2018/0158328 A1* | 6/2018 | Benhammou ........... H04L 9/083 |
| 2018/0174449 A1* | 6/2018 | Nguyen ................. G08G 1/056 |
| 2020/0065443 A1* | 2/2020 | Liu ..................... G06F 11/3664 |

FOREIGN PATENT DOCUMENTS

| | | |
|---|---|---|
| CN | 105092259 A | 11/2015 |
| CN | 106153352 A | 11/2016 |
| WO | WO2016183525 A1 | 11/2016 |

OTHER PUBLICATIONS

Chinese Office Action corresponding to Chinese Application 201880039605.8, with English language summary; dated May 17, 2022; 13 pages.
European Search Report corresponding to European Application No. EP 18 79 4558, dated Dec. 9, 2020, 9 pages.
International Search Report corresponding to International application No. PCT/US2018/030737, dated Aug. 17, 2018, 3 pages.
Written Opinion corresponding to International application No. PCT/US2018/030737, dated Aug. 17, 2018, 3 pages.
European Patent Office Office Action corresponding to European Application No. P301555EP, dated May 20, 2022, 7 pages.

* cited by examiner

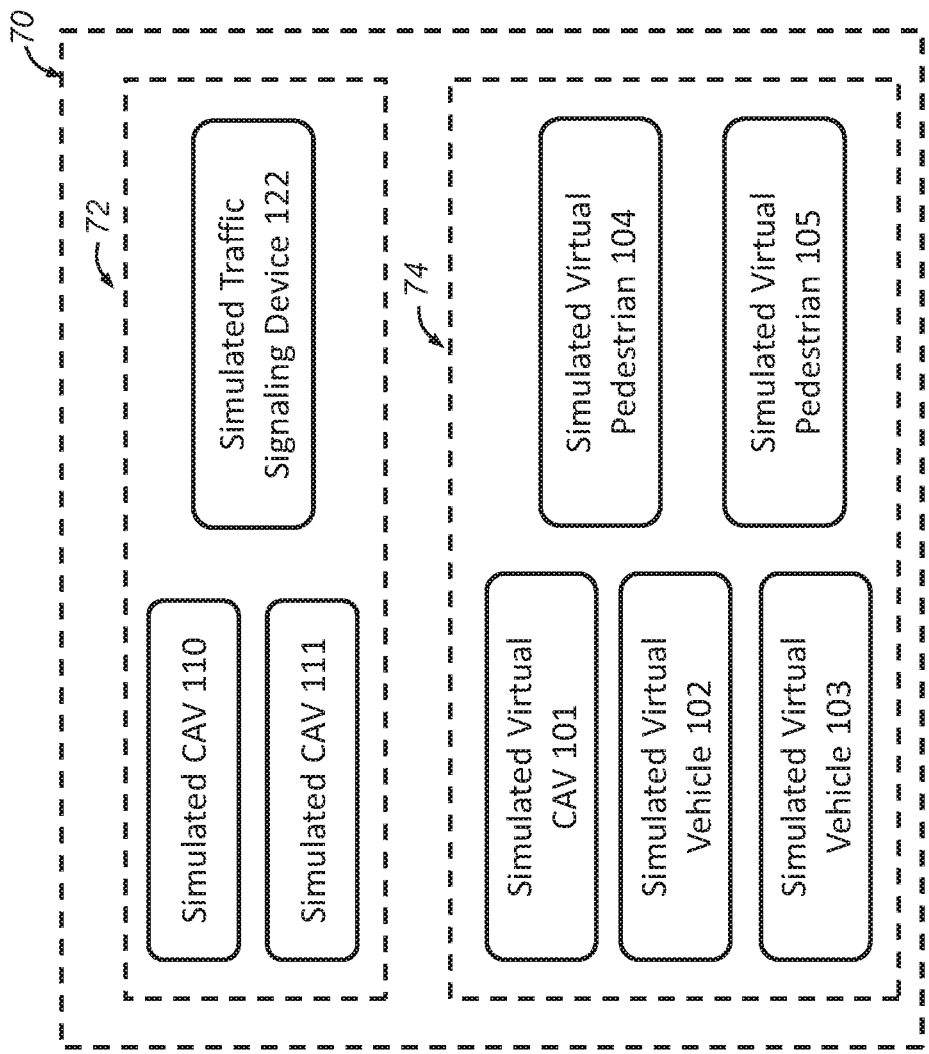

SIMULATED VEHICLE TRAFFIC FOR AUTONOMOUS VEHICLES

STATEMENT REGARDING FEDERALLY SPONSORED RESEARCH

This invention was made with government support under Grant Number 69A3551747105 awarded by the US Department of Transportation. The government has certain rights in the invention.

TECHNICAL FIELD

This invention relates to methods and systems for testing connected autonomous vehicles on roadways, and to methods and systems for generating a simulated environment using data from the connected autonomous vehicles and from the real environment in which they are operating.

BACKGROUND

The development and ultimate deployment of autonomous vehicles typically involves several phases including an initial design and prototyping stage, a controlled testing stage, and a real-world testing stage where the vehicle is operated on the open (public) roadways. An advantage of the controlled testing stage is that vehicle testing may be conducted in a safe, controlled environment where the responsiveness and accuracy of the vehicle's operations may be readily determined. However, a complete testing environment should also include background traffic to interact with the vehicles under test. The presence of other types of objects and obstructions, including pedestrians, would also desirably be included to enable testing of the vehicle in the variety of scenarios that the vehicle may reasonably be expected to encounter. However, involving real vehicles and other objects as background traffic is not only costly, but also difficult to coordinate and control.

SUMMARY

In accordance with an aspect of the invention, there is provided a method of simulating a real roadway environment containing at least one real vehicle and augmented with one or more virtual vehicles. The method comprises: receiving vehicle status information from a connected real vehicle as it moves along a roadway, wherein the vehicle status information includes location data indicating a location of the real vehicle on the roadway; and generating a simulated environment of the real vehicle on the roadway using a mapped model of the roadway and the vehicle status information, wherein the simulated environment includes one or more virtual vehicles.

The method may further include any of the following features or any technically-feasible combination of two or more of the following features:

- The real vehicle may be a connected autonomous vehicle (CAV) driving along the roadway, and the receiving and generating steps may be carried out by a computer system that receives the vehicle status information from the CAV.
- The method may include operating the simulated environment at a computing facility in real time with the operation of the real vehicle as it moves along the roadway.
- The receiving step may further comprise receiving the vehicle status information at the computing facility as time-location (TL) data that includes the real vehicle's location on the roadway at a particular time and that is periodically received from the real vehicle at the computing facility and is used to update in real time the position of the real vehicle in the simulated environment.
- The method may include receiving real traffic signal status information from one or more real traffic signaling devices at the computing facility, wherein the generating step further comprises generating the simulated environment using the real traffic signal status information.
- The step of receiving vehicle status information may further comprise receiving the vehicle status information at the computing facility as a succession of basic safety messages (BSMs) that are received from the real vehicle either via roadside equipment or via a wireless carrier system, and wherein the step of receiving real traffic signal status information further comprises receiving the real traffic signal status information at the computing facility as signal phase and timing (SPaT) information that is received from the roadside equipment.
- The method may include generating simulated basic safety messages (sBSMs) at the computing facility, wherein the sBSMs include simulated virtual vehicle information, and sending the sBSMs to the real vehicle via the roadside equipment or the wireless carrier system.
- The method may include generating information pertaining to simulated virtual pedestrians at the computing facility, and sending the simulated virtual pedestrian information to the real vehicle via the roadside equipment or the wireless carrier system.
- The method may include generating a real time map of the simulated environment that includes a simulation of the real vehicle and a simulation of the one or more virtual vehicles, and displaying the real time map at the computing facility or at another facility.
- The method may be used as part of a method of testing a real connected autonomous vehicle (CAV), in which the method includes the steps of: simulating the CAV, roadway, and one or more virtual vehicles; and sending portions of the simulated environment including the one or more virtual vehicles from the computer system to the CAV for use by the CAV as sensor data indicative of its surrounding environment, whereby the CAV operates in an augmented reality that includes the one or more virtual vehicles.

In accordance with another aspect of the invention there is provided a simulation system that provides simulated virtual objects for use by a connected real vehicle during testing of the vehicle on a roadway, comprising one or more computers that include an electronic processor and memory storing instructions that, when executed by the processor, cause the processor to: receive vehicle status information from a connected real vehicle as it moves along a roadway, wherein the vehicle status information includes location data indicating a location of the real vehicle on the roadway; and generate a simulated environment of the real vehicle on the roadway using a mapped model of the roadway and the vehicle status information, wherein the simulated environment includes one or more virtual vehicles.

The simulation system may further include any of the following features or any technically-feasible combination of two or more of the following features:
  The system may include at least one first interface for receiving the vehicle status information or real time traffic signal status information, or both, and a second interface for sending simulated virtual vehicle information to the real vehicle from the simulation system.
  The system may receive the vehicle status information as a succession of basic safety messages (BSMs) and receive the real time traffic signal status information as signal phase and timing (SPaT) information, and wherein the simulation system generates the simulated environment using the BSMs and SPaT information.
  The system may send simulated basic safety messages (sBSMs) to the real vehicle via the second interface, wherein the sBSMs include the simulated virtual vehicle information.
  The system may generate information pertaining to simulated virtual pedestrians at the computing facility, and send the simulated virtual pedestrian information to the real vehicle.
  The system may generate a real time map of the simulated environment that includes a simulation of the real vehicle and a simulation of the one or more virtual vehicles.

In accordance with another aspect of the invention there is provided a method of testing one or more real connected autonomous vehicles (CAVs) at a testing location using simulated data, wherein the method comprises:
  receiving real vehicle status information from each of the one or more real CAVs at the testing location;
  receiving real traffic signal status information from one or more real traffic signaling devices at the testing location;
  for each of the one or more real CAVs, generating a simulated real vehicle in a simulated environment, wherein the simulated environment is generated from data indicative of at least portions of the geometry and infrastructure of the testing location;
    attributing the real vehicle status information received from each of the one or more real CAVs to its corresponding simulated real vehicle in the simulated environment;
    attributing the real traffic signal status information received from each of the one or more real traffic signaling devices to corresponding simulated traffic signaling devices in the simulated environment;
  generating one or more simulated virtual vehicles within the simulated environment;
  updating the simulated environment in accordance with the attributed real vehicle status information and real traffic signal status information;
  for each of the one or more real CAVs, identifying a set of simulated data from the simulated environment to send, the simulated data including at least one of the one or more simulated virtual vehicles; and for each of the one or more real CAVs, sending the identified set of simulated data to the real CAVs.

The method of the previous paragraph may further include any of the following features or any technically-feasible combination of two or more of the following features:
  The step of receiving real vehicle status information may further comprise receiving the vehicle status information at the testing location as a succession of basic safety messages (BSMs) that are received from the one or more real CAVs either via roadside equipment or via a wireless carrier system, and wherein the step of receiving real traffic signal status information may further comprise receiving the real traffic signal status information at the testing location as signal phase and timing (SPaT) information that is received from the one or more real traffic signaling devices.
  The method may include generating simulated basic safety messages (sBSMs) at the computing facility, wherein the sBSMs include simulated virtual vehicle information, and wherein the sending step further comprises sending the sBSMs to the one or more real CAVs.
  The method may include generating information pertaining to simulated virtual pedestrians at the computing facility, and sending the simulated virtual pedestrian information to the real vehicle via the roadside equipment or the wireless carrier system.

BRIEF DESCRIPTION OF THE DRAWINGS

Preferred exemplary embodiments will hereinafter be described in conjunction with the appended drawings, wherein like designations denote like elements, and wherein:
FIGS. 4A and 4B depict the simulated environment both diagrammatically and graphically, respectively.

DETAILED DESCRIPTION

The system and method described herein enables the testing of real connected autonomous vehicles (CAVs) on roadways using augmented reality to add simulated environmental objects such as additional vehicles, pedestrians, and other obstructions to the nearby surroundings seen by the vehicle under test. This may be done generally by running a real-time simulation in synchronicity with the operation of the CAV on the roadway, with the simulation using a mapped model of the roadways and traffic control systems used in the test along with real-time vehicle status information from the CAV under test. With that information, the simulation may add virtual elements, such as other vehicles moving along the roadways, and may provide these virtual elements back to the CAV, again in real-time, to act as sensor input data to the CAV such that the CAV views these additional simulated vehicles and other objects as real objects existing in its operating environment. This permits the construction of an almost unlimited number of objects and scenarios under which the CAV may be tested without incurring the costs and risks associated with involving real vehicles and other objects.

The simulation of the operating environment of the CAV may generally be carried out by (1) receiving vehicle status information from a connected real vehicle as it moves along a roadway, wherein the vehicle status information includes location data indicating a location of the real vehicle on the roadway, and (2) generating a simulated environment of the real vehicle on the roadway using a mapped model of the roadway and the vehicle status information, wherein the simulated environment includes one or more virtual vehicles. This simulation of the real vehicle's operating environment may be used for a number of different purposes, one of which is for testing of the CAV on the roadway. Thus, in at least in some embodiments, the method may include sending portions of the simulated environment, including the one or more virtual vehicles, to the CAV for use by the CAV as sensor data indicative of its surrounding environment, whereby the CAV operates in an augmented reality that includes the one or more virtual vehicles. Other virtual objects may be included in addition to or in lieu of the virtual vehicle(s).

After receiving these certain components or portions of the simulated environment, the real CAVs may be expected to behave in a manner consistent with the received simulated virtual vehicles or other objects, and the responses of the CAVs may be measured and used for validation and improvements of the CAV operation. The simulated virtual objects used in the simulated environment may include virtual CAVs, virtual non-connected vehicles, virtual pedestrians, virtual traffic signals, and/or various other virtual components that can be generated for purposes of testing one or more scenarios in which the real CAVs may encounter.

Figure 1A:
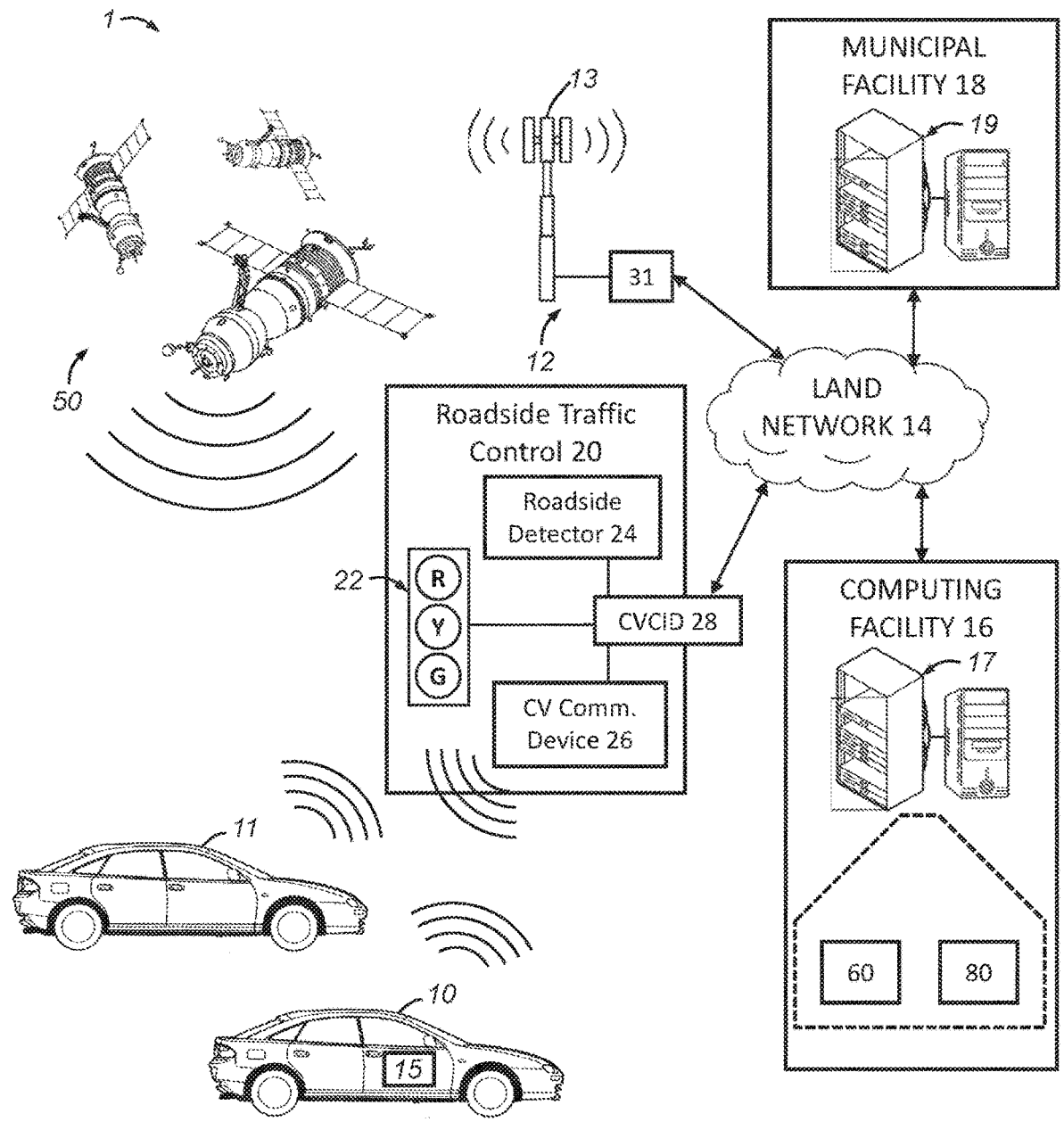
FIGS. 1A and 1B depict a communications system that includes a computer-based system for carrying out the roadway environment simulation for one or more real connected autonomous vehicles.
Figure 1B:
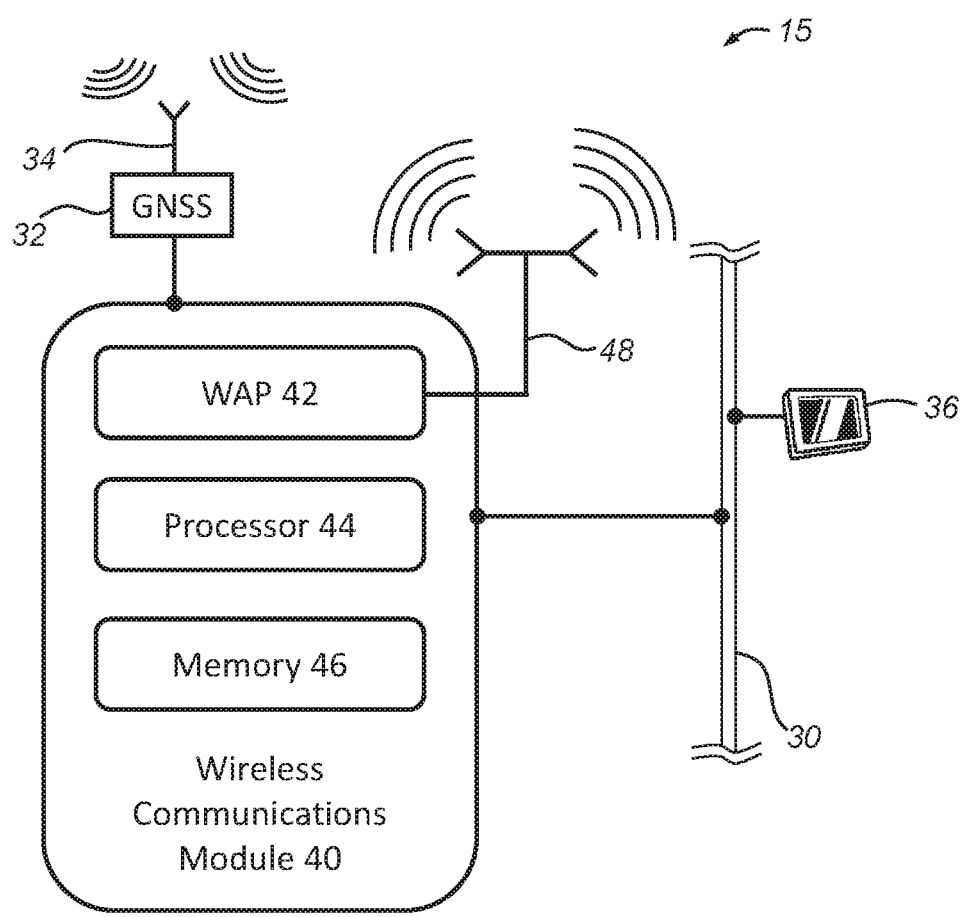

Referring now to FIGS. 1A-1B, there is shown an operating environment that comprises a communications system 1 and that can be used to implement the method disclosed herein. Communications system 1 generally includes connected autonomous vehicles (CAVs) 10,11 that may include a wireless communications module 40 and a global navigation satellite system (GNSS) module 32, a constellation of GNSS satellites 50, one or more wireless carrier systems 12, a land communications network 14, a computing facility 16, a municipal facility 18, an roadside traffic control system 20, and a connected vehicle-based controller interface device (CVCID) 28. The roadside traffic control system 20 includes a traffic signaling device 22, roadside detector 24, and connected vehicle (CV) communications device 26, as well as the CVCID 28, at least in some embodiments. Vehicle-to-infrastructure (V2I) communications includes the necessary hardware and infrastructure to enable communications to be carried out between vehicles and certain networks, such as computing facility 16 and/or municipal facility 18. These facilities are but one example of computer systems that can carry out vehicle-to-infrastructure (V2I) communications. It should be understood that the disclosed method can be used with any number of different systems and is not specifically limited to the operating environment shown here. Also, except as specifically described herein, the architecture, construction, setup, and operation of the various components of system 1 may be implemented by hardware and software components that are known in the art, or that will be apparent to those skilled in the art. Thus, the following paragraphs simply provide a brief overview of one such communications system 1; however, other systems not shown here could employ the disclosed method as well.

Wireless carrier system 12 may be any suitable cellular telephone system. Carrier system 12 is shown as including a cellular tower 13; however, the carrier system 12 will typically include a multitude of geographically-distributed cellular towers as well as one or more of the following components (e.g., depending on the cellular technology): base transceiver stations, mobile switching centers, base station controllers, evolved nodes (e.g., eNodeBs), mobility management entities (MMEs), serving and PGN gateways, etc., as well as any other networking components required to connect wireless carrier system 12 with the land network 14 or to connect the wireless carrier system with user equipment (UEs, e.g., which include telematics equipment in vehicles 10,11), all of which is indicated generally at 31. Carrier system 12 can implement any suitable communications technology, including for example GSM/GPRS technology, CDMA or CDMA2000 technology, LTE technology, etc. In general, wireless carrier systems 12, their components, the arrangement of their components, the interaction between the components, etc. is generally known in the art.

Apart from using wireless carrier system 12, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (e.g., news, music) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicles 10,11 and the uplink transmitting station. If used, this satellite telephony can be utilized either in addition to or in lieu of wireless carrier system 12.

Land network 14 may be a conventional land-based telecommunications network that is connected to one or more landline telephones and connects wireless carrier system 12 to computing facility 16. For example, land network 14 may include a public switched telephone network (PSTN) such as that used to provide hardwired telephony, packet-switched data communications, and the Internet infrastructure. One or more segments of land network 14 could be implemented through the use of a standard wired network, a fiber or other optical network, a cable network, power lines, other wireless networks such as wireless local area networks (WLANs), or networks providing broadband wireless access (BWA), or any combination thereof. In some embodiments, land network 14 can include any wired/wireless local area network (LAN) or local interconnect network (LIN), and may be implemented using routers and/or Ethernet cables. In one embodiment, a testing facility 100 may be near the computing facility 16 and, thus, a LAN or LIN may be suitable for communicating information from vehicles 10,11 to facility 16 and/or facility 18.

Connected autonomous vehicles (CAVs) 10,11 are depicted in the illustrated embodiment as a passenger car, but it should be appreciated that any other vehicle including motorcycles, trucks, sports utility vehicles (SUVs), recreational vehicles (RVs), bicycles, other vehicles or mobility devices that can be used on a roadway or sidewalk, etc., can also be used. Also, in various other embodiments, vehicles 10,11 can be other connected vehicles (CVs), such as non-autonomous CVs. Vehicles 10,11 are real vehicles and may be referred to herein as "real vehicles," "real CVs," or "real CAVs" depending on the particular embodiment. These "real vehicles" are not to be confused with virtual (non-existent) vehicles (or virtual CVs or virtual CAVs) or simulated vehicles (e.g., simulated real vehicles or simulated virtual vehicles). As used herein, simulated vehicles are representations of vehicles within a computer-based simulation, such as the simulated environment 70 discussed farther below. They may include simulated real vehicles (including simulated real CVs or simulated real CAVs) or simulated virtual vehicles (including simulated virtual CVs or simulated virtual CAVs).

As shown in the illustrated embodiment vehicle 10 includes vehicle electronics 15. Although vehicle electronics are not depicted for vehicle 11, it should be appreciated that vehicle 11 also includes an identical or similar set of vehicle electronics 15, which are included in vehicle 10. With reference to FIG. 1B, the vehicle electronics 15 includes the global navigation satellite system (GNSS) receiver or module 32 with its antenna 34 to receive GNSS radio signals from satellites 50. The vehicle electronics 15 further includes a wireless communications module 40 that enables communication between the vehicle and remote servers or network devices, such as those at computing facility 16. GNSS module 32 may be any suitable commercially available GNSS receiver and may provide NMEA or other output messages to wireless communications module unit 40, which may then be sent as GNSS information or time-location (TL) data from the vehicle 10. As mentioned above, vehicle 11 includes the same components, devices, and modules as vehicle 10, even though these components are not depicted.

The time-location (TL) data is data indicative of the global position of the connected device at one or more particular points in time. In at least some embodiments, the TL data may be one or more trackpoints comprising global position coordinates of the device along with time data representing when the device was at the location represented by the trackpoint(s). Thus, the trackpoints provide location data indicative of the location of the vehicle. In the embodiments discussed herein, a GNSS receiver incorporated into the CV (e.g., CAV 10 or 11) is used to generate the global position data (i.e., GNSS information or data) that is used for the TL data, although other techniques for position determination may be used instead of or in addition to the use of GNSS information. The trackpoints or other global position data that is provided by each individual CV may be generated by that device from received GNSS radio signals using whatever GNSS receiver is included in the device, and may be provided in NMEA format, GPX format, or otherwise. The TL data also includes time data indicative of when the CV was at the position indicated by the global position data, and this time data may be provided by the GNSS receiver along with the global position data (e.g., as a UTC time included in a NMEA standard output format), or the time data may be provided in other ways or from other sources Global navigation satellite system (GNSS) module 32 receives radio signals from the constellation of GNSS satellites 50. The GNSS module 32 can then generate TL data or other data that provides a location, which can then be used to identify known locations or a location of the vehicle. Additionally, GNSS module 32 may be used to provide navigation and other position-related services to the vehicle operator. Also, new or updated map data can be downloaded to the GNSS module 32 from the computing facility 16 via a vehicle telematics unit. The TL data can be supplied to computing facility 16 or other computing facility, such as municipal facility 18, for certain purposes, such as for modeling the real CAVs 10,11 in a simulation system 60, as discussed in more detail below. In some embodiments, the GNSS module 32 may be a global positioning system (GPS) module that receives GPS signals from GPS satellites that are a part of the U.S. GPS satellite system. Receivers for use with GLONASS and/or Europe's Galileo system may also be used. The GNSS signals may be used to generate TL data that includes time data, and this time data may be the time when the GNSS module receives information from satellites 50, a time indicated in the GNSS signals received from the GNSS satellites 50, or other contemporaneous timestamp.

In one embodiment, vehicles 10,11 may be configured to periodically send GNSS information/TL data to computing facility 16. For example, the vehicle may send this information to the computing facility every 100 ms in the form of a Basic Safety Message (BSM), which will be discussed more below. Additionally, the vehicle may send heading information (e.g., the direction the front of the vehicle is facing) or other vehicle information to the computing facility 16. As discussed above, once the computing facility 16 receives TL data from the vehicle 10 and/or vehicle 11, the computing facility 16 may store the information at a memory device and/or may process the data according to one or more set of computer instructions, such as computer instructions that may be configured to carry out at least part of the method described herein.

Wireless communications module 40 includes a wireless access point (WAP) 42, a processor 44, a memory 46, and an antenna 48. Wireless communications module 40 can be an OEM-installed (embedded) or aftermarket device that is installed in the vehicle and that enables wireless data communication over land network 14 via wireless networking (e.g., such as through dedicated short range communication (DSRC) with CV communications device 26). This enables the vehicle to communicate with computing facility 16 and/or municipal facility 18, other DSRC-enabled vehicles, or some other entity or device. In other embodiments, the wireless communications module 40 can include a cellular chipset, or the vehicle electronics may include a separate telematics that can enable cellular communications with carrier system 12.

Wireless communications module 40 receives GNSS information or other TL data from GNSS module 32 and, subsequently, sends such TL data to computing facility 16 or municipal facility 18. It may be connected to an intra-vehicle communications bus 30 that enables communication with other electronic systems on the vehicle. For this purpose, wireless communications module 40 can be configured to communicate wirelessly according to one or more wireless protocols via WAP 42, including DSRC such as any of the IEEE 802.11 protocols, WiMAX™, ZigBee™, Wi-Fi Direct™, Bluetooth™, or near field communication (NFC). In some embodiments, WAP 42 can be implemented using a DSRC chipset. When used for packet-switched data communication such as TCP/IP, the telematics unit can be configured with a static IP address or can set up to automatically receive an assigned IP address from another device on the network such as a router or from a network address server.

Processor 44 can be any type of device capable of processing electronic instructions including microprocessors, microcontrollers, host processors, controllers, vehicle communication processors, and application specific integrated circuits (ASICs). It can be a dedicated processor used only for wireless communications module 40 or can be shared with other vehicle systems. Processor 44 executes various types of digitally-stored instructions, such as software or firmware programs stored in memory 46, which enable the wireless communications module 40 to provide a wide variety of services. For instance, processor 44 can execute programs or process data that can be used to feed input to or receive output from certain embodiments of the methods discussed herein. In one embodiment, wireless communications module 40 includes an application (e.g., computer program) that enables the processor to send GNSS information or other TL data to a computing facility 16. Memory 46 may include RAM, other temporary powered memory, any non-transitory computer-readable medium (e.g., NVRAM or EEPROM), or any other electronic computer medium that stores some or all of the software needed to carry out the various external device functions discussed herein.

In some embodiments, the wireless communications module 40 can be an onboard unit (OBU) that can receive DSRC communications from CV communications devices 26. In one embodiment, the OBU 40 can be installed into an onboard diagnostics port (e.g., via a ODB-II connector) in the vehicle 10. The OBU can be programmed with certain computer instructions that report certain vehicle status information back to computing facility 16 via CV communications devices 26 and land network 14. The OBU or wireless communications module 40 can be configured to decode Basic Safety Messages (including simulated BSMs (sBSMs) and signal phase and timing (SPaT) messages from traffic signaling devices. Also, BSM messages that includes vehicle status information about the vehicle 10 can be generated and sent via OBU or wireless communications module 40 to computing facility 16. The OBU or wireless communications module 40 can use user datagram protocol (UDP) in real-time to send received messages to another vehicle system module that can decode the received messages, which may be SPaT messages or BSMs. Other protocols known to those skilled in the art can be used, such as transfer control protocol (TCP).

Furthermore, it should be understood that at least some of the aforementioned modules could be implemented in the form of software instructions saved internal or external to wireless communications module 40, they could be hardware components located internal or external to wireless communications module 40, or they could be integrated and/or shared with each other or with other systems located throughout the vehicle, to cite but a few possibilities. In the event that the modules are implemented as VSMs located external to wireless communications module 40, they could utilize vehicle bus 30 to exchange data and commands with the telematics unit.

Figure 2A:
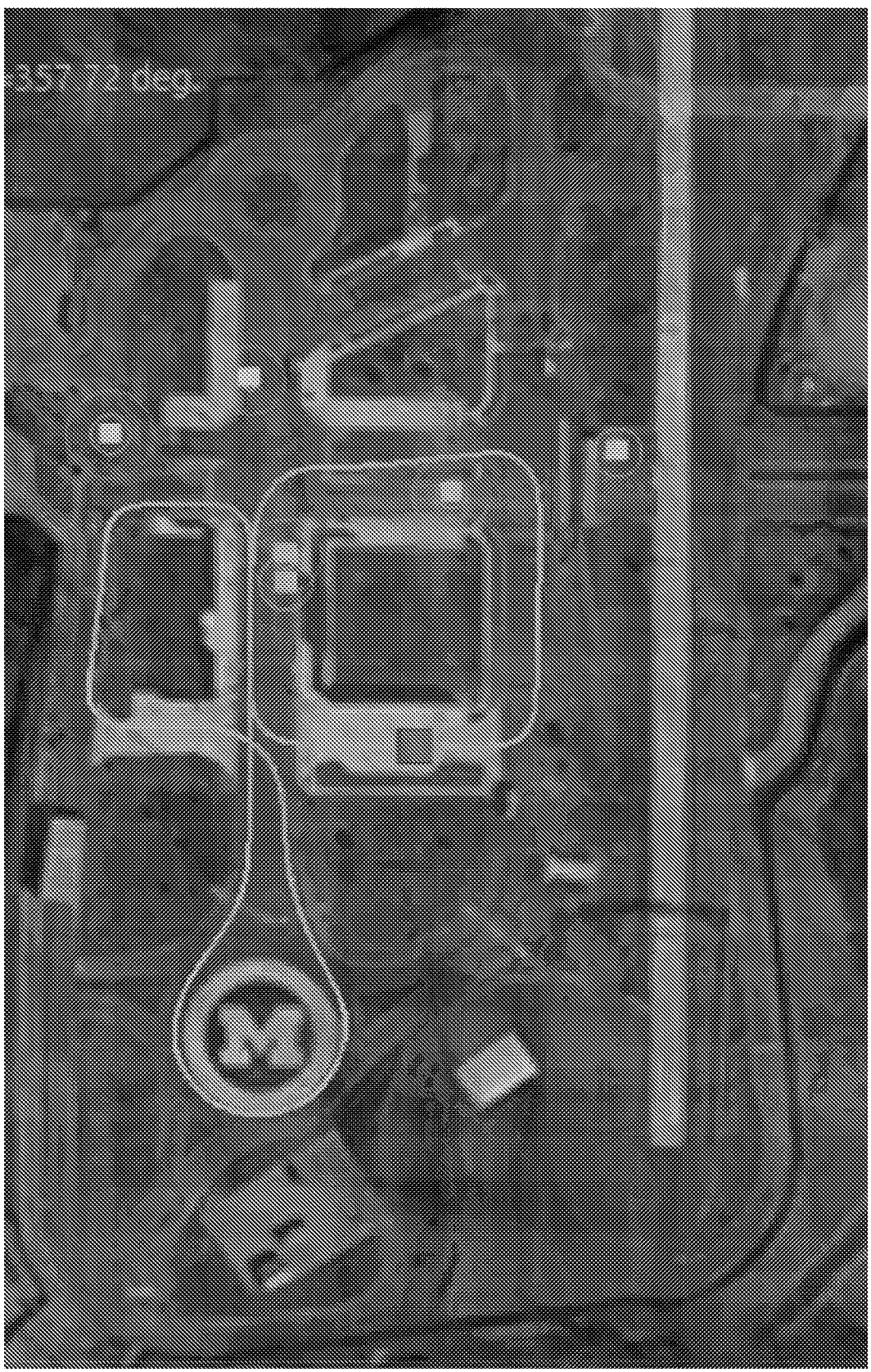
FIG. 2A is an aerial view of a test facility in which a real vehicle is operating using the simulated environment.

Vehicle electronics 15 also includes a visual display 36, which can be located in the vehicle cabin and that can provide certain graphical user interfaces to the operator or user of vehicles 10,11. In one embodiment, a test engineer may be operating (or a passenger in a CAV), and can use visual display 36 to view certain test statistics, test data, or video of the test vehicles. For example, FIG. 2A shows an aerial view of a test facility in which the rectangles represent vehicles, with the smaller rectangles with light circles representing simulated vehicles (such as simulated virtual vehicles 101-103 as discussed below in FIG. 4A) and the large square representing a real CAV (e.g., CAV 10 or 11).

Figure 2B:
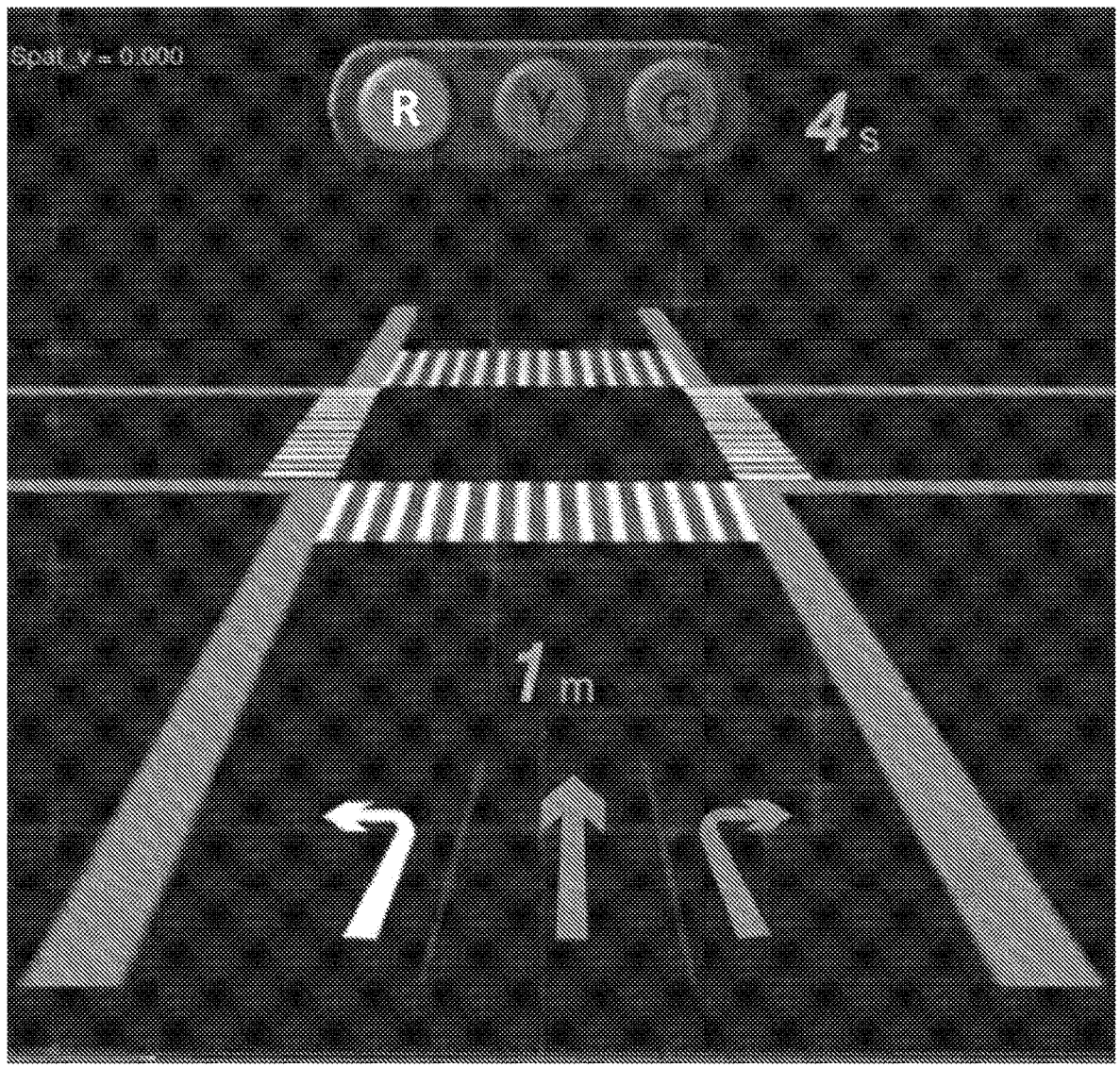
FIG. 2B depicts a traffic signal status for a traffic signal at a road intersection.

Also, certain graphics can be generated that depict certain test or roadway information, including navigation information. As shown in FIG. 2B, there is shown a current vehicle signal status (e.g., a vehicle signal status of traffic signaling device 22, as discussed more below), with the remaining time left for that signal ("4 s"), the vehicle movement direction (the left arrow is highlighted), and the distance to stop-bar ("1 m"). Also, in other embodiments, the contents of FIGS. 2A and/or 2B can be displayed to a user at computing facility 16, such as via user interface 98 (as discussed below in FIG. 7).

With reference back to FIG. 1A, there is shown roadside traffic control system 20 is depicted as including traffic signaling device 22, roadside detector 24, and CV communications device 26, but can include a network switch, additional roadside equipment, additional roadside detectors, additional CV communications devices, additional traffic signals or other types of traffic signaling devices, a router, a modem, other network interface controller or module, and/or a memory device. Any one or more of these components can be housed in the traffic signal and/or in a separate housing located near the traffic signal. Also, the roadside traffic control system 20 can include the CVCID 28, or the CVCID 28 may be separate from the system 20. In one embodiment, the roadside traffic control system 20 can include one or more controllers, each of which can include a processor and memory. This controller could be configured to receive, process, and send data to and from traffic signaling device 22, roadside detector 24, CV communications device 26, and CVCID 28. The roadside traffic control system 20 can also include a memory device, which can be a memory management unit (MMU) and/or a non-volatile memory device, such as EEPROM or other suitable memory. Roadside traffic control system 20 can also include one or more network interfaces (including any suitable hardware, such as network interface cards (NIC) or wireless NIC) and may be able to communicate with one or more remote servers via land network 14. Also, roadside traffic control system 20 can include other network capabilities, such as cellular or other wireless communication capabilities, such as is indicated for CV communications device 26. The traffic signal can send traffic signal status information or data to a computing facility, such as computing facility 16 or municipal facility 18. As used herein, traffic signal status refers to the operation of traffic cues of a traffic signal, such as whether a traffic light is green, red, or yellow (or amber). The traffic signal status can include a unique identifier (ID) used to identify the particular intersection at which the traffic signal is located, as well as time data that provides a time or a range of times in which the signal status refers to and/or is associated with. Although only one roadside traffic control system 20 is depicted, numerous roadside traffic control systems may be used and each may include one or more traffic signaling devices 22 or other traffic signaling devices, as well as other roadside detectors 24, CV communications devices 26, and/or CVCIDs 28.

Traffic signaling device 22 is depicted as a stoplight or traffic light ("R" for red light, "Y" for yellow or amber light, and "G" for green light), but it should be appreciated that other traffic signaling devices can be used instead, such as any electronic signaling device that may be used to indicate information to a vehicular or pedestrian user of the roadway. Additionally, although there is only one traffic signal shown, it should be appreciated that numerous traffic signals may be used in system 1 and/or traffic signal system 20, and that various types of traffic signaling devices may be used. The traffic signaling device 22 can include a traffic signal controller that sends traffic signal statuses to the CVCID 28, such as via signal time and phasing (SPaT) messages.

Roadside detector 24 may include an inductance loop detector, a video detector, or other traffic-related equipment and/or sensors that may be situated along a roadside or near an intersection. The roadside detector 24 can be used to detect vehicles at an intersection or along a roadway, and this data may be sent to other devices at roadside traffic control system 20, such as traffic signaling device 22, CV communications device 26, or CVCID 28. When sent to CVCID 28, this information may be sent to computing facility 16 or municipal facility 18.

Connected vehicle (CV) communications device 26 can include network communication interfaces, such as WNIC or NIC, and may communicate directly with one or more nearby vehicles, such as via short-range wireless communications (DSRC). The CV communications device 26 may be controlled by a controller at roadside traffic control system 20 or by CVCID 28. The CV communications device 26 can receive SPaT messages and/or BSM messages using UDP, or other protocols known to those skilled in the art, such as TCP. For example, as will be discussed more below, the CV communications device can be used to receive Basic Safety Messages (BSMs) from one or more CVs or CAVs, and then to send the received BSMs to the CVCID 28. Also, the CV communications device 26 can receive simulated BSMs and signal phase and timing (SPaT) messages from the CVCID 28 (or other device), and then send these messages to CAVs 10,11. The CV communications device 26 can also include a processing device and/or memory device, both of which may be used to carry out its functionality, as discussed herein.

CVCID 28 can enable communications between the roadside traffic control system 20 and the simulation system 60, which is discussed more below. The CVCID 28 can include a processor and a memory device. CVCID 28 can run an operating system, such as Linux™. The CVCID 28 can include numerous modules (that will be discussed in more detail below), which can be in the form of software modules, ASICs, or other software/hardware combinations. The CVCID aggregates information from the CAVs 10,11 and sends this information to the simulation system 60. CVCID 28 can include various components that enable the reception, processing, and sending of certain data and information, such as basic safety messages (BSMs) and signal time and phasing (SPaT) messages. The BSMs can be a standard BSM message, such as SAE J2735 BSMs, or may be other messages that contain vehicle information, such as vehicle TL data, other location data, vehicle speed, vehicle heading, vehicle acceleration, vehicle system module statuses, or other vehicle status information. The SPaT messages can be standard SPaT messages, or may be other messages that contain traffic signal status information, such as certain states of the traffic signaling device at certain times.

Municipal facility 18 includes traffic signaling control system 19, which may include various computers, databases, servers, and other computing devices. Traffic signaling control system 19 may be used for controlling traffic signaling devices, such as traffic signal 22, or may be used for processing traffic-related data, including estimated traffic volumes (e.g., the traffic volume estimation value). In one embodiment, traffic signaling control system 19 can receive data from computing facility 16, such as estimated traffic volumes, and, then, may generate traffic control data that can be sent to traffic signals or other traffic signaling devices such as pedestrian cross-walk lights and lane direction and closure signals. Traffic signaling control system 19 may receive traffic information from one or more traffic sensors, such as inductance loop detectors and/or video detectors, or from other roadside detectors 24 that may be located at or near intersections. In some embodiments, municipal facility 18 or traffic signaling control system 19 may receive information from vehicles 10,11, simulation system 60, data collection system 90 (shown in FIG. 7), and/or other CVs via CV communications device 26 and/or land network 14. In some embodiments, simulation hardware 17 and traffic signaling control system 19 can be located at the same facility (e.g., computing facility 16 or municipal facility 18) and/or may be carried out using the same set of hardware, such as a group of servers or computers.

Computing facility 16 may be designed to provide the CAVs 10,11 and roadside traffic control system 20 with a number of different system back-end functions. Computing facility 16 may include various components and may include a wired or wireless local area network (LAN or WLAN). Computing facility 16 may include simulation hardware 17, which can include numerous computers, servers, databases, and other computing devices. Generally, computing facility 16 may receive and transmit data via a modem connected to land network 14. A database at the computing facility 16 (e.g., at simulation hardware 17) can store vehicle information (e.g., GNSS information, other TL data), traffic signaling device information, roadside detector information, and other data or information from roadside traffic control system 20 and/or vehicles 10,11. Data transmissions may also be conducted by wireless systems, such as IEEE 802.11x, GPRS, and the like. The simulation hardware 17 can be used to implement the simulation system 60, data collection system 90, and/or one or more other applications or systems.

Either or both of computing facility 16 and municipal facility 18 can include one or more servers or computers that each include an electronic processor and memory. The processors can be any type of device capable of processing electronic instructions including microprocessors, microcontrollers, host processors, controllers, vehicle communication processors, and application specific integrated circuits (ASICs). The processors may execute various types of digitally-stored instructions, such as software or firmware programs stored in the memory, which enable the facility to provide a wide variety of services. For instance, the processors at the computing facility 16 may be configured to execute programs or process data to carry out at least a part of the method discussed herein. In one embodiment, the process can execute an application (e.g., computer program) that causes the processor to perform one or more of the method steps on the GNSS information or other TL data that is received from the one or more vehicles 10,11, and/or other CVs. The memory at computing facility 16 or municipal facility 18 can include RAM, other temporary powered memory, any non-transitory computer-readable medium (e.g., NVRAM or EEPROM), or any other electronic computer medium that stores some or all of the software needed to carry out the various external device functions discussed herein.

Figure 3:
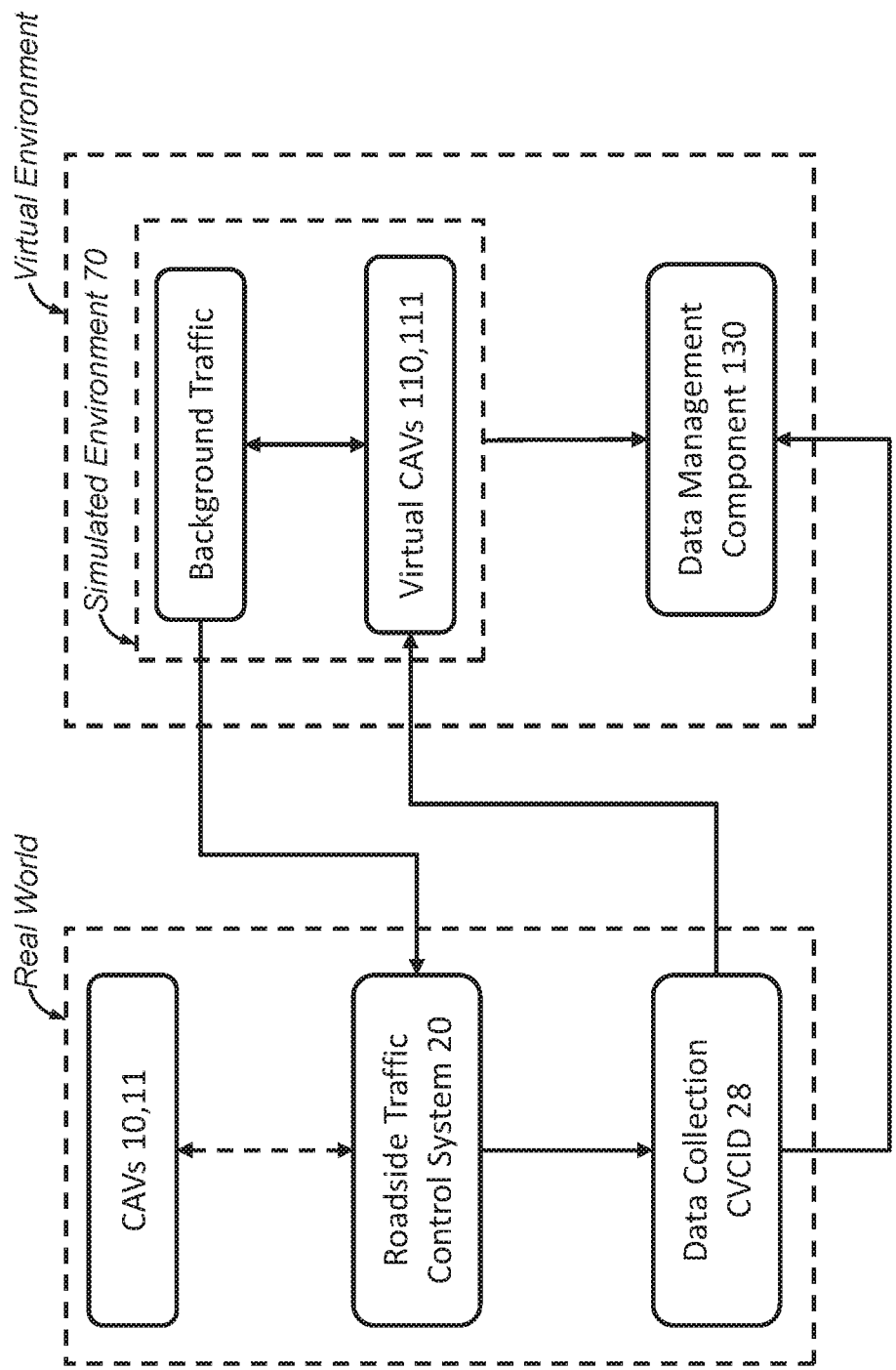
FIG. 3 diagrammatically depicts both real components and simulated components of the operating environment in which the communications system of FIG. 1 operates.
Figure 4B:
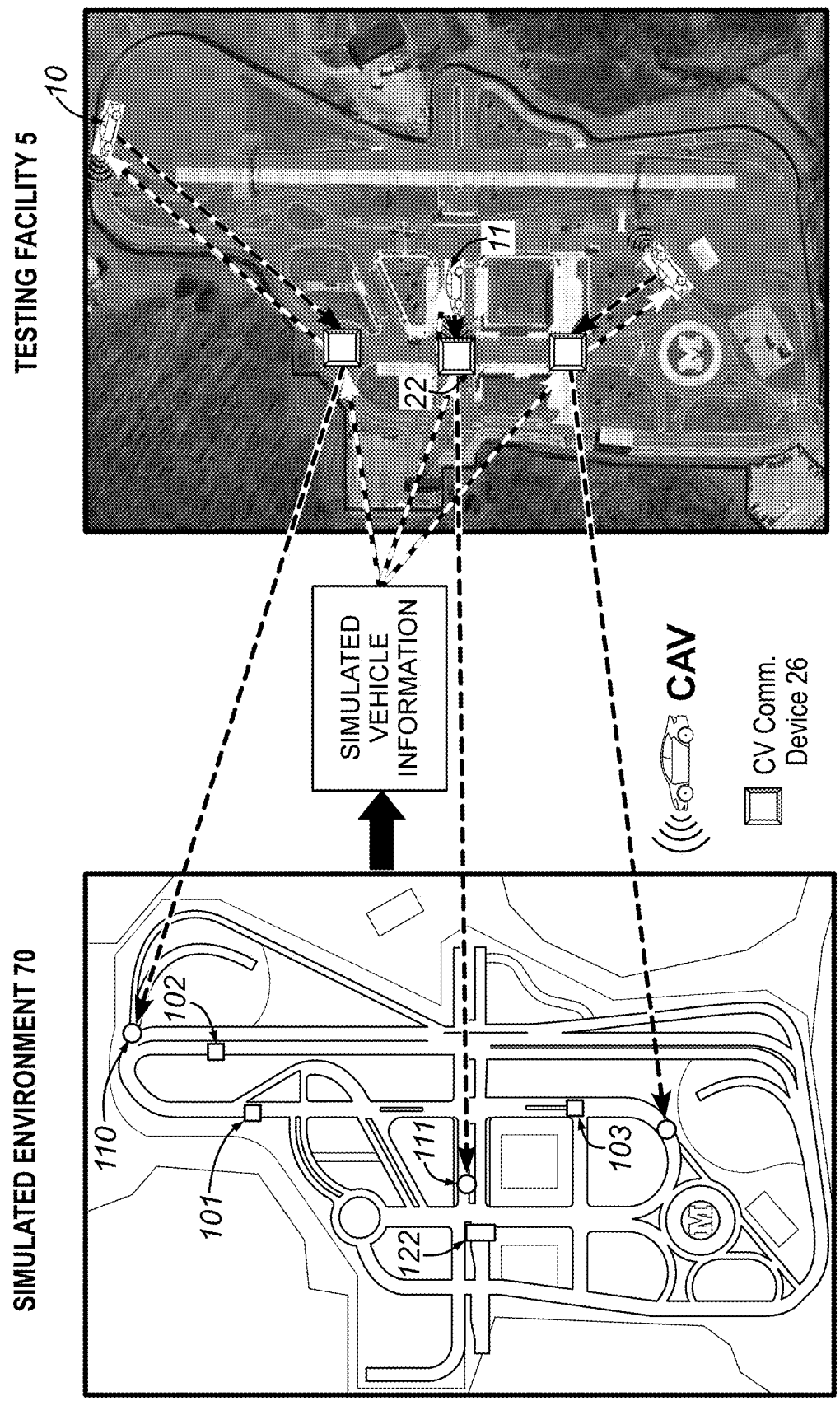

In some embodiments, simulation hardware 17 may be used to implement at least part of one or more embodiments of the methods disclosed herein. The simulation system 60 enables the testing of real connected autonomous vehicles (CAVs) operating in a testing facility and under a variety of simulated scenarios and/or environments. The simulation system 60 can run one or more applications or computer instructions that generate a simulated environment 70 (FIGS. 3, 4A and 4B). These simulation applications can take certain inputs, such as data of the testing facility and vehicle status information from one or more real CAVs, such as real CAVs 10,11. The simulation system 60 can generate a simulated CAV for each of the one or more real CAVs in the testing facility and that are to be tested. Vehicle status information, such as TL data or other location data indicative of the location of the CAVs within the testing facility, can be sent from the real CAVs 10,11 to the simulated system 60 via CVCID and land network 14, which can then process the information and update the simulated CAVs with the information such that the simulated CAVs model the real CAVs within the simulated environment 70 (FIG. 4A-4B). The same can be done for traffic signaling devices; for example, traffic signal status information can be received from the CVCID 28, which can then be used to update one or more corresponding simulated traffic signaling devices within the simulated environment.

In addition to modeling the real test environment, the simulated environment can introduce one or more other virtual vehicles, which can be simulated virtual CAVs, other simulated virtual CVs (e.g., non-autonomous connected vehicles), and/or other simulated virtual vehicles (e.g., vehicles that are not connected vehicles). As used herein, a connected vehicle (CV) is a vehicle that is capable of communicating with one or more other networks via wireless communications, such as via short-range wireless communications (DSRC). As used herein, a connected autonomous vehicle (CAV) is a connected vehicle that is capable of at least partly autonomously operating a primary propulsion device of the vehicle (e.g., an internal combustion engine, a primary electric propulsion motor, or other primary mover) and of at least partly autonomously steering of the vehicle along the roadway.

With reference to FIG. 3, there is shown a brief overview of real-world components and components of a virtual environment. The real-world includes actual hardware and physical devices, such as real CAVs 10,11, roadside traffic control system 20, and data collection device CVCID 28. The virtual environment includes software components that perform certain functionality, including the simulated environment 70 and data management component 130. The simulated environment 70 includes background traffic (e.g., simulated components as discussed below in FIG. 4A), and simulated real CAVs 110,111.

With reference to FIGS. 4A and 4B, there is shown an embodiment of the simulated environment 70. The simulated environment 70 includes a simulated real portion 72 and a simulated virtual portion 74. The simulated real portion 72 includes simulated CAVs 110 and 111 (represented in the circles in FIG. 4B), as well as simulated traffic signaling device 122 (represented in the elongate rectangle in FIG. 4B). The simulated CAVs 110,111 correspond to real CAVs 10,11, and simulated traffic signaling device 122 corresponds to real traffic signaling device 22. These components of the simulated portion 72 are modeled in the simulated environment and are simulation models of the real entity to which it corresponds. The virtual portion 74 includes simulated virtual CAV 101, simulated virtual vehicles 102,103 and simulated virtual pedestrians 104,105. These simulated virtual components 101-105 do not correspond to any real entity in the testing environment. Virtual vehicles 101-103 are represented in the simulated environment 70 in FIG. 4B by squares; virtual pedestrians are not represented in FIG. 4B. It should be appreciated that various other real devices or entities can be modeled in the simulator 68 by generating a corresponding simulated entity as a part of simulated portion 72, and that various virtual entities that do not correspond to a real entity can be generated as a part of the simulated virtual portion 74. The simulator 68 can update these components 101-105, 110, 111, and 122 and then send data or information pertaining to certain portions or components to CVCID 28 or other devices, as will be discussed below.

The simulated environment 70 is constructed using a mapped model of the testing facility. This mapped model may be constructed or represented by data in any suitable manner, and includes various physical and geographic features of the testing facility such as road geometry, road connectivity, and other road attributes, as well as various surrounding test facility features, such as traffic signals, buildings, driveway entrances/exits, sidewalks, poles, trees, and any other objects or features desired for the purposes of CAV testing.

Figure 5:
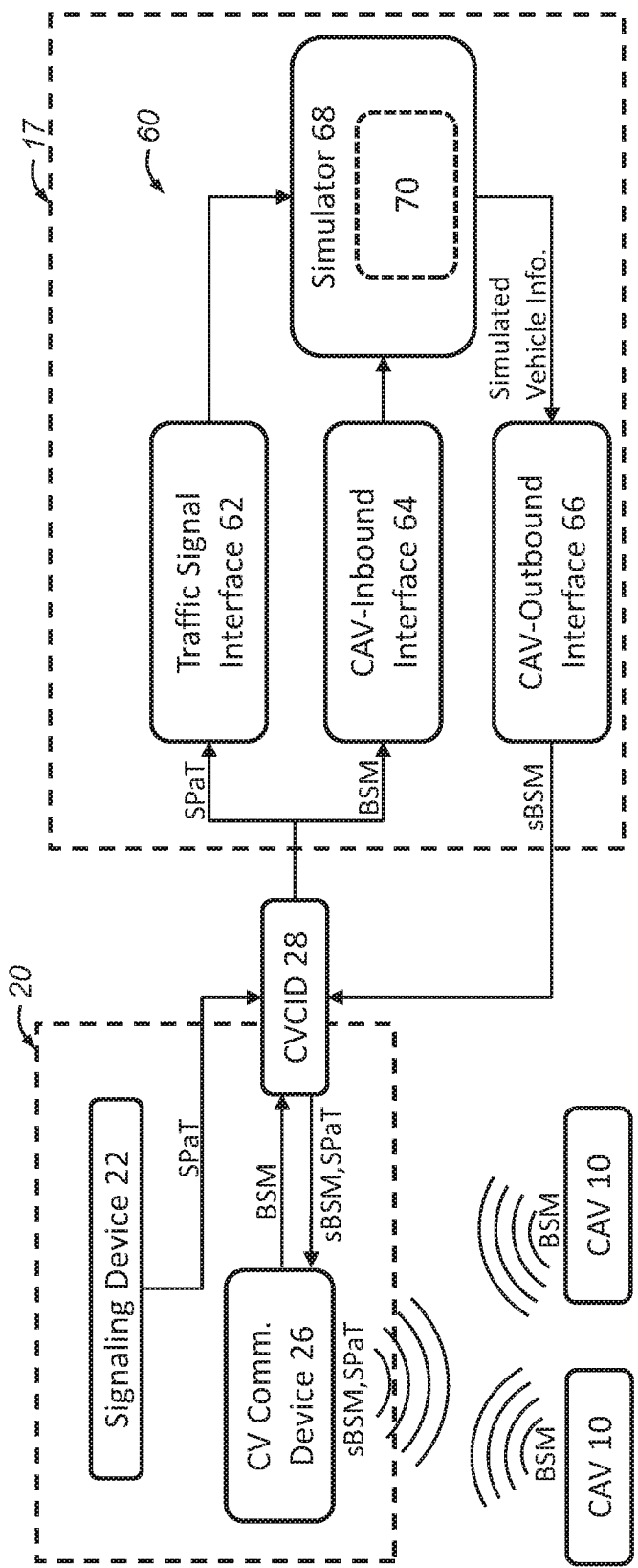
FIG. 5 depicts components of, and communication between, roadside traffic equipment, real vehicles, and simulation hardware that generates the simulated environment.

With reference to FIG. 5, there is shown an embodiment of roadside traffic control system 20, real CAVs 10,11, and simulation hardware 17, including various communications therebetween. The simulation system 60 can include a traffic signal interface 62, a CAV-inbound interface 64, a CV-outbound interface 66, and a simulator 68. The simulator can generate the simulated environment 70, and the interfaces 62-66 can facilitate the input and output of the simulator 68. In some embodiments, the simulation system 60 may carry out one or more of the steps of the method discussed herein. The simulator 68, as well as traffic signal interface 62, CV-inbound interface 64, and CV-outbound interface 66, can include various software (e.g., dynamic linked libraries, executables), which may be carried out on simulation hardware 17 at computing facility 16.

Figure 6:
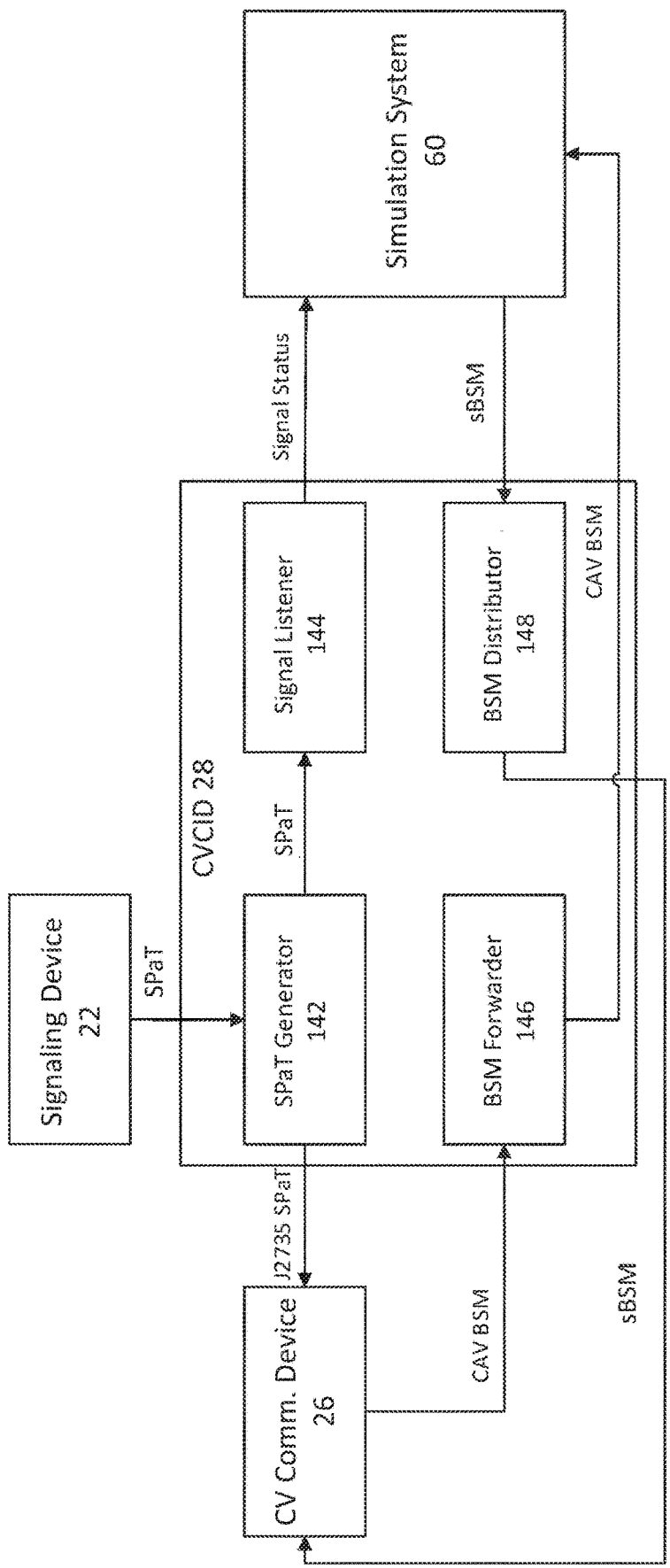
FIG. 6 depicts components of, and communication between, a real vehicle, roadside equipment, and the simulation hardware.

The traffic signal interface 62 can be an application programming interface (API) for the simulator 68 (which may be a VISSIM, as discussed below) that controls traffic signals in the simulation externally through receiving SPaT messages or other data indicating the traffic signal status of one or more real traffic signaling devices 22. The traffic signal interface 62 can be implemented as a dynamic link library (DLL) written in C/C++. The process of synchronizing traffic signal status between the simulation system 60 and reality can include the steps of: (1) setup UDP socket communication and read IP address and port of the target CVCID's signal listener 144 (FIG. 6); (2) periodically (e.g., every one second of simulation time), request traffic signal status information from the signal listener 144 in CVCID (FIG. 6) through UDP; and (3) upon receiving the response from CVCID, update the corresponding signal statuses in simulation (e.g., update the status of the simulated traffic signaling device 122).

CAV-inbound interface 64 can be an application programming interface (API) or component object model (COM) interface that can synchronize the behavior of the real CAVs 10,11 in reality with the simulated CAVs 110,111 in the simulated environment 70. Upon receiving the first BSM from each real CAV 10,11, the CAV-inbound interface may create a simulated vehicle in simulation (e.g., simulated vehicles 110,111). Due to the GPS errors, the exact locations extracted the received BSM may not be always on the roadway. A greedy algorithm may be used to map the virtual CAV accurately in the road links.

CAV-outbound interface 66 can be an API for the simulator 68 (which may be a VISSIM, as discussed below) that allows users to apply different driving behavior models for some or all of the vehicles in the simulator 68. The traffic signal interface 62 can be implemented as a dynamic link library (DLL) written in C/C++. This interface 66 can receive simulate vehicle information from the simulator 68 and then generate simulated BSMs (sBSMs) for the simulated virtual vehicles 101-103. Also, other simulated information that may be received from the simulator 68 may be processed by CAV-outbound interface 66 and formatted for sending to CVCID 28. In at least one embodiment, the CAV-outbound interface 66 can carry out the steps of: (1) setup UDP socket communication and read IP address and port of the target CVCID's BSM distributor 148 (FIG. 6); (2) read vehicle information every simulation step from VISSIM including vehicle location, speed, acceleration, and heading (e.g., the simulated vehicle information); (3) transform the vehicle position coordinates from local simulated X, Y coordinates to GNSS or GPS coordinates (e.g., WGS-84) applying, for example, a transformation algorithm as is known in the art. This algorithm first can transform local simulated X, Y coordinates to the earth-centered earth-fixed (ECEF) rectangular coordinates. The ECEF coordinates has its x axis extended through the intersection of the prime meridian (0° longitude) and the equator (0° latitude). The z axis extends through the true North Pole. They axis completes the right-handed coordinate system, passing through the equator and 90° longitude. Then the ECEF coordinates are transformed to GPS coordinates.

The simulator 68 can be implemented using traffic simulation software such as PTV Vissim (or PTV VISSIM), or other traffic simulation or modeling software. The simulator 68 can generate a simulated environment 70, which can include various simulated components, such as simulated virtual vehicles 101-103, simulated virtual pedestrians 104-105, simulated real CAVs 110,111, and simulated real traffic signaling devices 122. The simulator 68 can be capable of modeling other virtual vehicle traffic, virtual pedestrian traffic, and other forms of virtual roadway or airway traffic. The simulator may receive initial inputs that can be used for initialization, calibration, or other setup process. These initial inputs can be map data, geometry data, or other infrastructure data, which reflect a real testing environment, such as a testing facility (e.g., Mcity in Ann Arbor, Mich.) or an open roadway that may be used for testing (e.g., public roadways upon which testing may be carried out). The simulator 68 can use this information as a basis for the simulated environment 70. In one embodiment, the simulated environment uses this initial input information or data to model road geometry and infrastructure equipment (e.g., traffic signaling devices, roadway signs, vehicle detectors). The simulated virtual vehicles 101-103, virtual pedestrians 104-105, and other virtual objects can be generated based on Poisson arrival with a predefined traffic parameters and vehicle routes. Also, the simulator 68 can generate or include preset performance measures, such as travel time, number of stops, and other behavioral parameters. Any of these measures or parameters may be adjusted before or during the simulation.

As shown, the traffic signaling device 22 can send SPaT messages to the CVCID 28, which may then process and send the SPaT messages to the traffic signal interface 62 of the simulation system 60. The traffic signal interface may process (including formatting) the incoming SPaT messages and, then, may send traffic signal data (e.g., the data contained in the SPaT message, but represented in a different format) to the simulator 68. The traffic signal status in reality and in the simulated environment can be synchronized so that movements of the real CAVs 10,11 and other virtual vehicles 101-103 can follow the same signal indications. The CV communications device 26 can communicate with one or more CVs or CAVs 10,11 via DSRC, and may receive BSMs from the CAVs 10,11. The BSMs received from vehicles 10,11 can include certain vehicle information, such as TL data. The vehicles 10,11 may periodically send this information to the CV communications device 26, such as every 100 ms. The CV communications device can then send this data to the CVCID 28, which may then forward these BSMs to the CV-inbound interface 64. The CV-inbound interface can then send the vehicle status information that was contained in the BSMs to the simulator 68.

The simulator 68 can use these inputs along with other inputs or data to generate the simulated environment 70. The simulated environment 70 may also be updated by the simulator. The CV-outbound interface 66 can receive certain portions or components of the simulated environment 70 (e.g., virtual vehicle information) and can compile this simulated information into simulated basic safety messages (sBSMs), which can then be sent to the CVCID 28. As used herein, "simulated virtual object information" refers information pertaining to one or more simulated virtual objects such as virtual vehicles 101-103 that were created by the simulator 68 and that do not correspond to any real vehicle. Also, other simulated virtual object information, such as information pertaining to virtual pedestrians 104-105, can be sent from simulator 68 to CAV-outbound interface 66. Also, any simulated information concerning real vehicles and objects (e.g., simulated virtual components 110, 111, and/or 122) can be sent to the CAV-outbound interface 66. The CVCID 28 can then receive these sBSMs and any other simulated real or virtual information, and then distribute them to the real CAVs 10,11 via CV communications device 26. Also, the CVCID 28, which receives SPaT messages from traffic signaling device 22, can send the SPaT messages to the CAVs 10,11 via CV communications device 26. When receiving sBSMs and SPaT messages from the simulated virtual vehicles 101, 102 and traffic signaling device 22, the real CAVs 10,11 can translate the received information to other formats that are compatible with the vehicle's perception and control system (e.g. PolySync). For example, the sBSMs can be converted to the same format as the input from Radar or Lidar sensors. In this way, the real CAVs receive the data concerning the simulated virtual vehicles and other objects as sensor input and so will respond as if the virtual objects are actually there in the real environment of the CAVs.

With reference to FIG. 6, there is shown an embodiment of the CVCID 28, the CV communications device 26, the traffic signaling device 22, and the simulation system 60, including certain communications therebetween. As shown, the CVCID 28 includes SPaT generator 142, signal listener 144, BSM forwarder 146, and BSM distributor 148. These components can be implemented via computer instructions that are carried out on a processor, or may be application-specific integrated circuits (ASICs), or may be implemented through use of various software, firmware, and hardware components. The SPaT generator 142 receives SPaT information from signal controllers and sends this SPaT information to signal listener 144. The SPaT generator 142 also may encode the data into SAE J2735 DSRC SPaT format and sends this information to the CV communications device 26 for broadcasting to the CAVs 10,11. The signal listener 144 receives SPaT information from SPaT generator 142 and records the signal status in a memory device at the CVCID. When receiving request from simulation system 60, the signal listener 144 sends the current signal status with the intersection or traffic signal ID back to simulation. The intersection ID can be a unique ID that is associated with a traffic intersection, and the traffic signal ID can be a unique ID that is associated with a traffic signaling device, such as traffic signaling device 22.

The BSM forwarder 146 receives BSMs of real CAVs 10,11 that are forwarded from the CV communications device 26, and then sends these BSMs to the simulation system 60. Because of the existence of other CVs near the testing facility, the BSM forwarder 146 can implemented a geo-fencing function that only forwards the BSMs within the testing facility. The BSM forwarder 146 can carry out this geo-fencing function by looking at TL data (which can include GNSS data) and determining if the GNSS data coordinate is outside the coordinates of the testing environment. The BSM distributor 148 receives simulated BSMs (sBSMs) from simulation system 60, which can have the same format as the BSMs that are broadcast from real CAVs 10,11. Then the BSM distributor 148 can randomly (or at least pseudo-randomly) distribute the sBSMs to all CV communications devices 26 in the testing environment, which can help balance the communication load.

Figure 7:
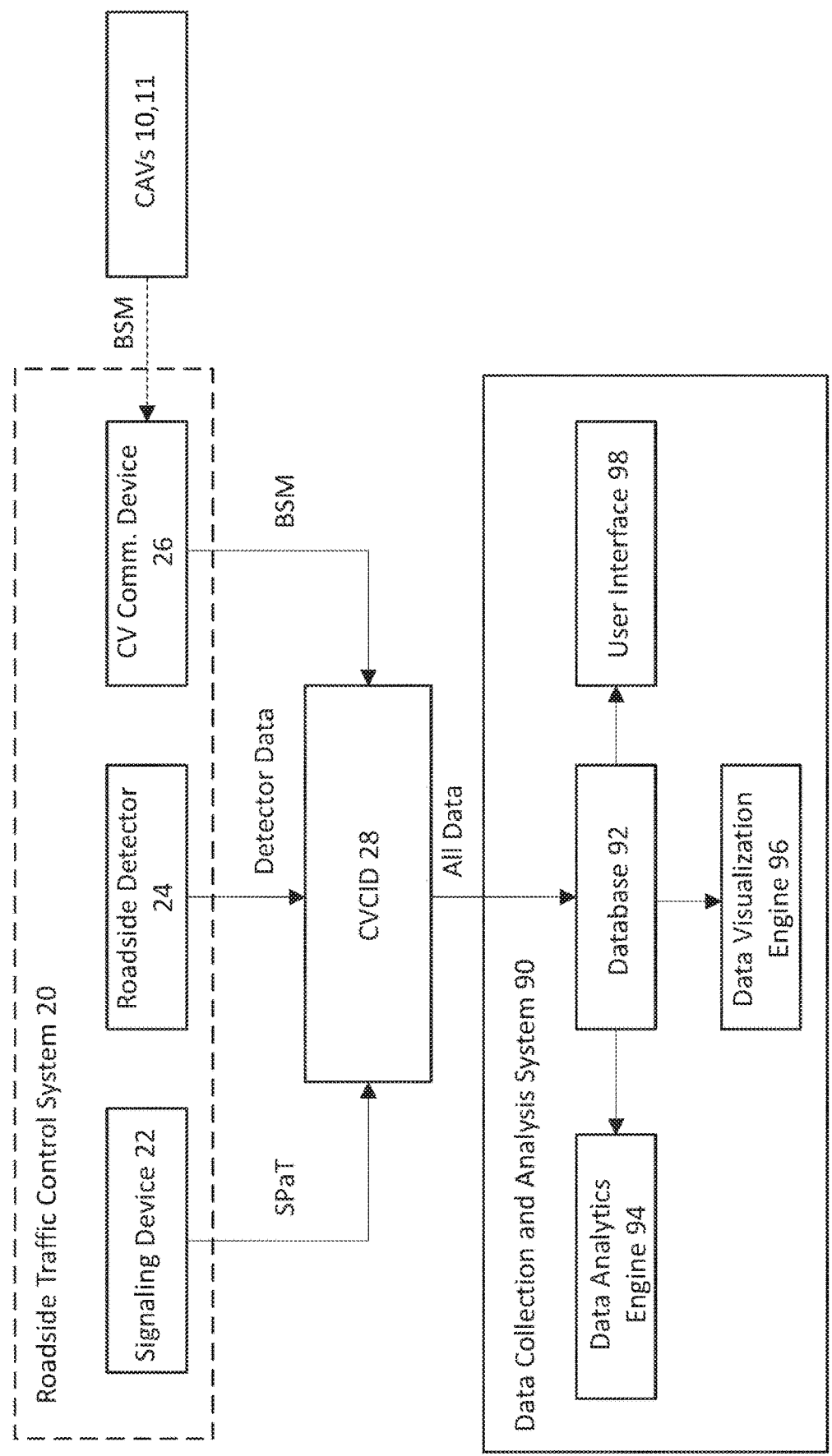
FIG. 7 depicts components of, and communication between, a real vehicle, roadside equipment, and a data collection and analysis system.

With reference to FIG. 7, there is shown a schematic depiction of an embodiment of the roadside traffic control system 20, CAVs 10,11, CVCID 28, and data collection and analysis system 90. The data collection and analysis system 90 includes four parts: database 92, data analytics engine 94, data visualization engine 96, and user interface 98. Database 92 can be implemented using Microsoft™ SQL Server, and can be used for the database design and implementation of the simulation system 60, storing vehicle information (e.g., vehicle status information that is included in BSMs) from CAVs 10,11, storing traffic signal information (e.g., traffic signal status information that is included in SPaT messages) from traffic signaling devices 22, information from roadside detectors 24, and other information from other CVs, simulation system 60, or other components of system 1. An intermediate application can be used to receive data from the CVCIDs and push to the database based on the data type, location, and/or timestamp.

The data analytics engine 94 and data visualization engine 96 can be used for analyzing the raw data (e.g., any of the data that was stored in database 92) and generating certain measurements of effectiveness (MOE) for the simulation and/or other metrics. The MOEs can include, but are not limited to CAV trajectory, DSRC communication range of the CAVs 10,11 or CV communication devices 26, signal timing chart, queue length of vehicles at a traffic light and other queue lengths, travel time, level of service (LOS), etc.

The user interface 98 can allow end users, system administrators, and other individuals to access the data in the database. These individuals can download data based on different criteria such as data sources and format, time periods and infrastructure locations to further analyze the testing results.

EXAMPLE SCENARIOS

Based on the above-described simulation hardware and architecture, some CAV or CV testing scenarios, which involve other modes of traffic, can be designed and implemented using the simulation system 60. The infrastructure in the testing environment can be utilized in varying extents in the example testing scenarios. Example testing scenarios include pedestrian crossing, rail crossing, vehicle platooning, and signal-free intersection control. Below are a few of the example testing scenarios that may be implemented using the system 1.

Scenario 1: Pedestrian Crossing. A testing CAV is traveling normally in the downtown area of the test facility while a simulated virtual pedestrian appears at the moving direction of the vehicle. The testing CAV should be able to detect the sudden appearance of the object and make a full stop to avoid the virtual pedestrian.

Scenario 2: Rail Crossing. When a testing CAV is approaching the railroad crossing, a simulated virtual train will be generated. The simulated virtual train will send DSRC messages to the testing CAV about its location, length, speed and time to pass. The testing CAV should be able to slow down and stop before the rail-crossing and wait for the virtual train.

Scenario 3: Vehicle Platooning. A highway segment can be utilized for this scenarios. A platoon of vehicles will generate a Cooperative Adaptive Cruise Control (CACC) platoon and travel along the highway section. The platoon consists of a testing CAV as well as several simulated virtual vehicles. The behaviors of all vehicles, such as speed and headway, should be coordinated by a CACC algorithm.

Scenario 4: Signal-free Intersection Control. Traffic signals can be removed at intersections if all vehicles are CAVs and they can pass the intersection in a self-organized way. In this scenario, traffic signals at the intersections in the test facility will be turned off and corresponding traffic signals in simulation will also be removed. Simulated virtual vehicles from different directions will approach the intersection including the real CAV under test. A higher level optimization algorithm will be needed to generate optimal trajectory profiles for all vehicles, in terms of minimizing total vehicle delay. Trajectory profile of the CAV under test will be transmitted to the vehicle through DSRC. It will follow the guidance to pass the intersection without colliding with the simulated virtual vehicles.

Method—

The system described above may be used for various methods of generating simulated environments and provided an augmented reality test experience for a vehicle. One such method generally includes the steps of receiving vehicle status information from a connected real vehicle as it moves along a roadway, wherein the vehicle status information includes location data indicating a location of the real vehicle on the roadway, and generating a simulated environment of the real vehicle on the roadway using a mapped model of the roadway and the vehicle status information, wherein the simulated environment includes one or more virtual vehicles. Also, at least in some embodiments, at least some of the simulated components or portions of the simulated environment can be sent to the one or more real autonomous test vehicles. Thus, for example, the CAV may use its onboard sensors to detect real objects in its environment and may receive from the simulation system 60 additional data to be used as additional virtual sensor input to indicate to the CAV the presence of additional, virtual vehicles and/or other objects. In other embodiments, the CAV may be provided with not only simulated virtual vehicles and/or other virtual objects, but also some or all of the simulated real vehicles and real environmental features to be used as the complete sensor input.

Figure 8:
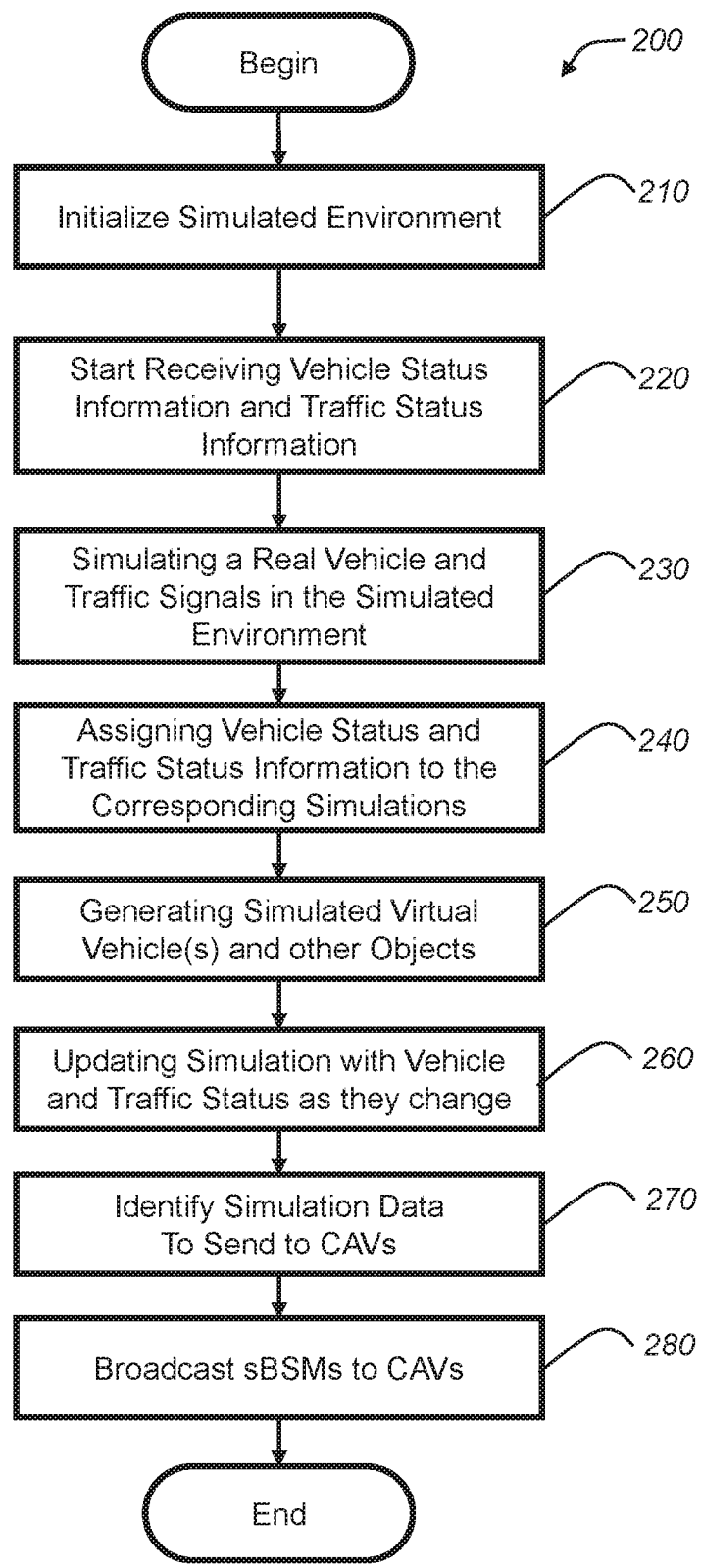
FIG. 8 is a flowchart of a method for generating a simulated environment autonomous vehicle testing.

FIG. 8 is a flowchart depicting a method 200 of generating a simulated environment for CAV testing and then generating simulated virtual vehicles and other virtual objects and providing back to the CAV data representing those virtual elements of the environment. The method includes:

210—initializing the simulated environment using a mapped model of the roadways and surrounding environs;

220—receiving real vehicle status information from each of the one or more real CAVs at the testing location, and receiving real traffic signal status information from one or more real traffic signaling devices at the testing location;

230—for each of the one or more real CAVs, generating a simulated real vehicle in the simulated environment, wherein the simulated environment is generated from data indicative of at least portions of the geometry and infrastructure of the testing location, and wherein the simulated real vehicle is positioned in the simulation at a location corresponding to its location in the real-world;

240—attributing (assigning) the real vehicle status information received from each of the one or more real CAVs to its corresponding simulated real vehicle in the simulated environment, and attributing the real traffic signal status information received from each of the one or more real traffic signaling devices to corresponding simulated traffic signaling devices in the simulated environment;

250—generating one or more simulated virtual vehicles within the simulated environment;

260—updating the simulated environment in accordance with the attributed real vehicle status information and real traffic signal status information;

270—for each of the one or more real CAVs, identifying a set of simulated data from the simulated environment to send, the simulated data including at least one of the one or more simulated virtual vehicles; and 280—for each of the one or more real CAVs, sending the identified set of simulated data to the real CAVs.

Figure 9:
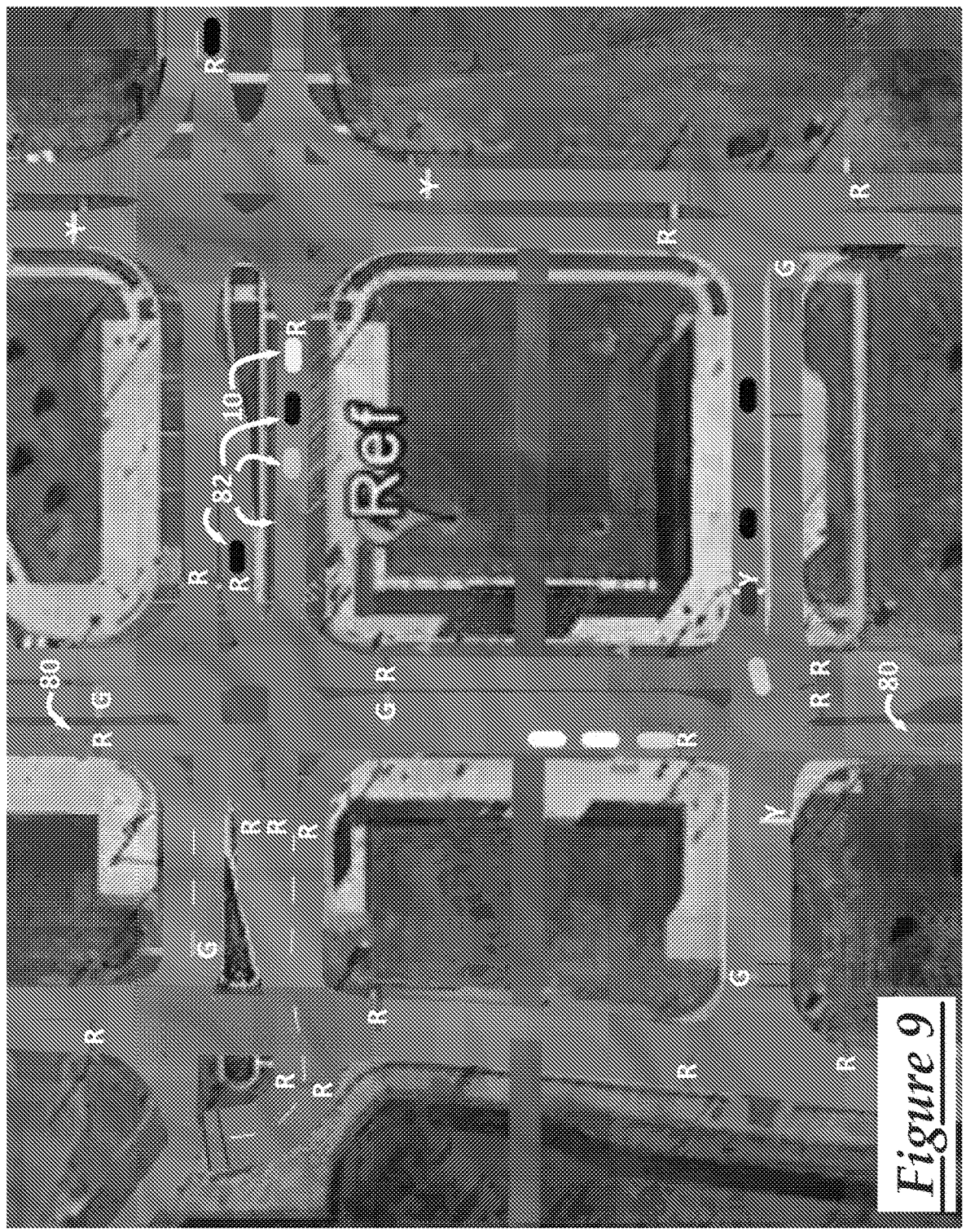
FIG. 9 depicts the results of a simulated environment superimposed on an aerial view of a test facility for an autonomous vehicle under test.

FIG. 9 depicts a more detailed example of the results of the simulation, with the aerial view of a portion of the test facility including the CAV 10 under test as well as simulated other real objects 80 and data (for example, color bars at each intersection indicating the current traffic signal status—red, yellow, or green—at each intersection for each direction of travel). Also shown are the simulated virtual vehicles 88 traversing the roadways, for which their locations and trajectories are shared with the CAV under test. For this, a mapped model of the testing facility is replicated in VISSIM in terms of the roadways and traffic signals locations. Simulated vehicles are generated based on Poisson arrival with predefined traffic demands vehicle routes. Performance measures such as vehicle delay, travel time, and number of stop are defined in the VISSIM model.

Figure 10:
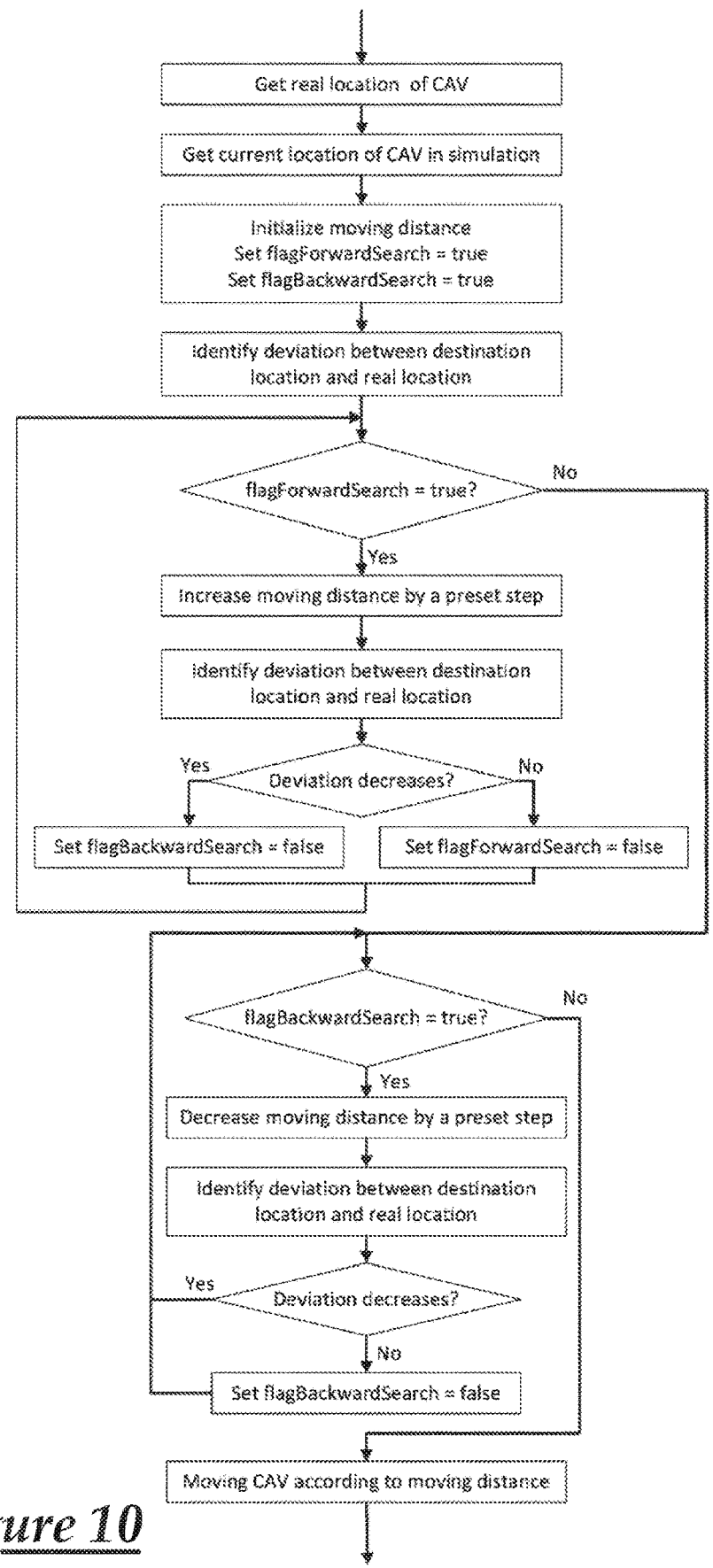
FIG. 10 is a flowchart of a vehicle mapping process for using autonomous vehicle location data to position a simulated real vehicle in the simulated environment.

FIG. 10 depicts an example vehicle mapping process for using the received CAV location data to maintain the current position of the simulated real CAV in the simulation. Other suitable methods for carrying this out will become apparent to those skilled in the art. The process may be carried out iteratively as a step in the simulation for continually moving the CAV under test within the simulation environment. Based on the location of the simulated real CAV in the previous simulation step and the received location from the real CAV, the process initializes a moving distance and calculates the initial deviation between the destination location and the real location of the CAV. It then increases or decreases the moving distance to search forward or backward for a better destination location that has a smaller deviation. If the deviation does not decrease, then the current moving distance is considered optimal. The final destination location of the CAV at current simulation step is then identified, which is closest to the received location.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

We claim:

1. A method of simulating a real roadway environment containing at least one real vehicle and augmented with one or more virtual vehicles, the method comprising:
   receiving vehicle status information from a connected real vehicle as the connected real vehicle moves along a roadway, wherein the vehicle status information includes location data indicating a location of the real vehicle on the roadway;
   generating a simulated environment of the real vehicle on the roadway using a mapped model of the roadway and the vehicle status information, wherein the simulated environment includes one or more virtual vehicles;
   operating the simulated environment at a computing facility in real time with the operation of the real vehicle as the real vehicle moves along the roadway;
   generating simulated basic safety messages (sBSMs) at the computing facility, wherein the sBSMs include simulated virtual vehicle information, wherein the sBSMs are attributed to at least one of the one or more virtual vehicles that is present within the simulated environment; and
   sending the sBSMs to the real vehicle.

2. The method of claim 1, wherein the real vehicle is a connected autonomous vehicle (CAV) driving along the roadway, and the receiving and generating steps are carried out by a computer system that receives the vehicle status information from the CAV.

3. A method of testing a real connected autonomous vehicle (CAV), comprising the steps of:
   simulating the CAV, roadway, and one or more virtual vehicles using the method of claim 2;
   sending portions of the simulated environment including the one or more virtual vehicles from the computer system to the CAV for use by the CAV as sensor data indicative of its surrounding environment, whereby the CAV operates in an augmented reality that includes the one or more virtual vehicles.

4. The method of claim 1, wherein the receiving step further comprises receiving the vehicle status information at the computing facility as time-location (TL) data that includes the real vehicle's location on the roadway at a particular time and that is periodically received from the real vehicle at the computing facility and is used to update in real time the position of the real vehicle in the simulated environment.

5. The method of claim 1, further comprising the step of receiving real traffic signal status information from one or more real traffic signaling devices at the computing facility, wherein the generating step further comprises generating the simulated environment using the real traffic signal status information.

6. The method of claim 5, wherein the step of receiving vehicle status information further comprises receiving the vehicle status information at the computing facility as a succession of basic safety messages (BSMs) that are received from the real vehicle either via roadside equipment or via a wireless carrier system, and wherein the step of receiving real traffic signal status information further comprises receiving the real traffic signal status information at the computing facility as signal phase and timing (SPaT) information that is received from the roadside equipment.

7. The method of claim 1, further comprising the steps of generating information pertaining to simulated virtual pedestrians at the computing facility, and sending the simulated virtual pedestrian information to the real vehicle via roadside equipment or a wireless carrier system.

8. The method of claim 1, further comprising the step of generating a real time map of the simulated environment that includes a simulation of the real vehicle and a simulation of the one or more virtual vehicles, and displaying the real time map at the computing facility or at another facility.

9. A simulation system that provides simulated virtual objects for use by a connected real vehicle during testing of the vehicle on a roadway, comprising one or more computers that include an electronic processor and memory storing instructions that, when executed by the processor, cause the processor to:
  receive vehicle status information from a connected real vehicle as the connected real vehicle moves along a roadway, wherein the vehicle status information includes location data indicating a location of the real vehicle on the roadway;
  generate a simulated environment of the real vehicle on the roadway using a mapped model of the roadway and the vehicle status information, wherein the simulated environment includes one or more virtual vehicles;
  operate the simulated environment at a computing facility in real time with the operation of the real vehicle as the real vehicle moves along the roadway;
  generate simulated basic safety messages (sBSMs) at the computing facility, wherein the sBSMs include simulated virtual vehicle information, wherein the sBSMs are attributed to at least one of the one or more virtual vehicles that is present within the simulated environment; and
  send the sBSMs to the real vehicle.

10. The simulation system defined in claim 9, further comprising at least one first interface for receiving the vehicle status information or real time traffic signal status information, or both, and a second interface for sending the simulated virtual vehicle information to the real vehicle from the simulation system.

11. The simulation system defined in claim 10, wherein the simulation system receives the vehicle status information as a succession of basic safety messages (BSMs) and receives the real time traffic signal status information as signal phase and timing (SPaT) information, and wherein the simulation system generates the simulated environment using the BSMs and SPaT information.

12. The simulation system defined in claim 11, wherein the simulation system sends the sBSMs to the real vehicle via the second interface.

13. The simulation system defined in claim 9, wherein the simulation system generates information pertaining to simulated virtual pedestrians at the computing facility, and sends the simulated virtual pedestrian information to the real vehicle.

14. The simulation system defined in claim 9, wherein the simulation system generates a real time map of the simulated environment that includes a simulation of the real vehicle and a simulation of the one or more virtual vehicles.

15. A method of testing one or more real connected autonomous vehicles (CAVs) at a testing location using simulated data, wherein the method comprises:
  receiving real vehicle status information from each of the one or more real CAVs at the testing location;
  receiving real traffic signal status information from one or more real traffic signaling devices at the testing location;
  for each of the one or more real CAVs, generating a simulated real vehicle in a simulated environment, wherein the simulated environment is generated from data indicative of at least portions of the geometry and infrastructure of the testing location;
  attributing the real vehicle status information received from each of the one or more real CAVs to its corresponding simulated real vehicle in the simulated environment;
  attributing the real traffic signal status information received from each of the one or more real traffic signaling devices to corresponding simulated traffic signaling devices in the simulated environment;
  generating one or more simulated virtual vehicles within the simulated environment;
  updating the simulated environment in accordance with the attributed real vehicle status information and real traffic signal status information;
  for each of the one or more real CAVs, identifying a set of simulated data from the simulated environment to send, the simulated data pertaining to at least one of the one or more simulated virtual vehicles; and
  for each of the one or more real CAVs, sending the identified set of simulated data to the real CAVs.

16. The method of claim 15, wherein the step of receiving real vehicle status information further comprises receiving the vehicle status information at the testing location as a succession of basic safety messages (BSMs) that are received from the one or more real CAVs either via roadside equipment or via a wireless carrier system, and wherein the step of receiving real traffic signal status information further comprises receiving the real traffic signal status information at the testing location as signal phase and timing (SPaT) information that is received from the one or more real traffic signaling devices.

17. The method of claim 16, further comprising the steps of generating simulated basic safety messages (sBSMs) at a computing facility, wherein the sBSMs include simulated virtual vehicle information, and wherein the sending step further comprises sending the sBSMs to the one or more real CAVs.

18. The method of claim 15, further comprising the steps of generating information pertaining to simulated virtual pedestrians at a computing facility, and sending the simulated virtual pedestrian information to the real vehicle via roadside equipment or a wireless carrier system.

* * * * *